United States Patent
Hagimura et al.

(10) Patent No.: US 7,020,395 B2
(45) Date of Patent: Mar. 28, 2006

(54) OPTICAL TRANSMISSION APPARATUS MONITORING OPTICAL PERFORMANCE

(75) Inventors: Dai Hagimura, Kawasaki (JP); Akihiko Oka, Kawasaki (JP); Junichi Ishiwatari, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/370,499

(22) Filed: Feb. 24, 2003

(65) Prior Publication Data

US 2003/0152384 A1 Aug. 14, 2003

Related U.S. Application Data

(63) Continuation of application No. PCT/JP00/06179, filed on Sep. 8, 2000.

(51) Int. Cl.
*H04B 10/08* (2006.01)
*H04B 17/00* (2006.01)

(52) U.S. Cl. .......................................... 398/25; 398/34

(58) Field of Classification Search .................. 398/25, 398/195, 196, 197, 34; 356/432; 372/29
See application file for complete search history.

(56) References Cited

U.S. PATENT DOCUMENTS

| | | | | |
|---|---|---|---|---|
| 5,032,025 | A * | 7/1991 | Bateman | 356/73.1 |
| 5,812,572 | A * | 9/1998 | King et al. | 372/38.04 |
| 6,333,805 | B1 * | 12/2001 | Kamata | 359/239 |
| 6,587,214 | B1 * | 7/2003 | Munks | 356/519 |

FOREIGN PATENT DOCUMENTS

WO    WO 02/21732 A1    3/2002

OTHER PUBLICATIONS

Japanese Abstract No.: 10-322287 dated Dec. 4, 1998.
Japanese Abstract No.: 10-247876 dated Sep. 14, 1998.
Japanese Abstract No.: 62-115330 dated May 27, 1987.
Japanese Abstract No.: 03-004128 dated Jan. 10, 1991.
Japanese Abstract No.: 07-314773 dated Dec. 5, 1995.
PCT JP00/06179—PCT International Search Report, Aug. 23, 2001.

* cited by examiner

*Primary Examiner*—Jason Chan
*Assistant Examiner*—Shi K. Li
(74) *Attorney, Agent, or Firm*—Staas & Halsey LLP

(57) ABSTRACT

An optical transmission apparatus in which the reliability and quality of optical performance monitoring are improved. A light output unit selects and outputs light of one of a plurality of wavelengths. A digital information conversion unit converts a performance parameter for the light to digital information. A conversion map management unit manages a conversion map including a conversion format for converting the digital information indicative of values which vary according to the wavelengths of light with the same output power so that reference values at normal operation time for all the wavelengths will be the same and used for converting the digital information to a monitored value. A display control unit exercises control over the displaying of the monitored value corresponding to the digital information.

6 Claims, 32 Drawing Sheets

M1 CONVERSION MAP

| 0.00 | 0.01 | 0.02 | 0.03 | 0.04 | 0.05 | 0.06 | 0.07 | 0.08 | 0.09 | 0.10 |
|---|---|---|---|---|---|---|---|---|---|---|
| 00h | 01h | 02h | 03h | 04h | 05h | 06h | 07h | 08h | 09h | 0Ah |
| 02.0 | 0.21 | 0.22 | 0.23 | 0.24 | 0.25 | 0.26 | 0.27 | 0.28 | 0.29 | 0.30 |
| 17h | 18h | 19h 1Ah | 1Bh | 1Ch | 1Dh 1Eh | 1Fh | 20h | 21h 22h | 23h | 24h |
| 0.40 | 0.41 | 0.42 | 0.43 | 0.44 | 0.45 | 0.46 | 0.47 | 0.48 | 0.49 | 0.50 |
| 30h | 31h | 32h 33h | 34h | 35h | 36h 37h | 38h | 39h | 3Ah 3Bh | 3Ch | 3Dh |
| 0.60 | 0.61 | 0.62 | 0.63 | 0.64 | 0.65 | 0.66 | 0.67 | 0.68 | 0.69 | 0.70 |
| 4Ah | 4Bh | 4Ch 4Dh | 4Eh | 4Fh | 50h 51h | 52h | 53h | 54h 55h | 56h | 57h |
| 0.80 | 0.81 | 0.82 | 0.83 | 0.84 | 0.85 | 0.86 | 0.87 | 0.88 | 0.89 | 0.90 |
| 63h | 64h | 65h 66h | 67h | 68h | 69h 6Ah | 6Bh | 6Ch | 6Dh 6Eh | 6Fh | 70h |
| 1.00 | 1.01 | 1.02 | 1.03 | 1.04 | 1.05 | 1.06 | 1.07 | 1.08 | 1.09 | 1.10 |
| 7Dh | 7Eh | 7Fh 80h | 81h | 82h | 83h 84h | 85h | 86h | 87h 88h | 89h | 8Ah |
| 1.20 | 1.21 | 1.22 | 1.23 | 1.24 | 1.25 | 1.26 | 1.27 | 1.28 | 1.29 | 1.30 |
| 96h | 97h | 98h 99h | 9Ah | 9Bh | 9Ch 9Dh | 9Eh | 9Fh | A0h A1h | A2h | A3h |
| 1.40 | 1.41 | 1.42 | 1.43 | 1.44 | 1.45 | 1.46 | 1.47 | 1.48 | 1.49 | 1.50 |
| B0h | B1h | B2h B3h | B4h | B5h | B6h B7h | B8h | B9h | BAh BBh | BCh | BDh |
| 1.60 | 1.61 | 1.62 | 1.63 | 1.64 | 1.65 | 1.66 | 1.67 | 1.68 | 1.69 | 1.70 |
| C9h | CAh | CBh CCh | CDh | CEh | CFh D0h | D1h | D2h | D3h D4h | D5h | D6h |
| 1.80 | 1.81 | 1.82 | 1.83 | 1.84 | 1.85 | 1.86 | 1.87 | 1.88 | 1.89 | 1.90 |
| E3h | E4h | E5h E6h | E7h | E8h | E9h EAh | EBh | ECh | EDh EEh | EFh | F0h |
| 2.00 FCh −FFh | | | | | | | | | | |

FIG. 2

M1 CONVERSION MAP

| 0.11 | 0.12 | 0.13 | 0.14 | 0.15 | 0.16 | 0.17 | 0.18 | 0.19 |
|---|---|---|---|---|---|---|---|---|
| 0Bh | 0Ch 0Dh | 0Eh | 0Fh | 10h 11h | 12h | 13h | 14h 15h | 16h |
| 0.31 | 0.32 | 0.33 | 0.34 | 0.35 | 0.36 | 0.37 | 0.38 | 0.39 |
| 25h | 26h 27h | 28h | 29h | 2Ah 2Bh | 2Ch | 2Dh | 2Eh | 2Fh |
| 0.51 | 0.52 | 0.53 | 0.54 | 0.55 | 0.56 | 0.57 | 0.58 | 0.59 |
| 3Eh | 3Fh 40h | 41h | 42h | 43h 44h | 45h | 46h | 47h 48h | 49h |
| 0.71 | 0.72 | 0.73 | 0.74 | 0.75 | 0.76 | 0.77 | 0.78 | 0.79 |
| 58h | 59h 5Ah | 5Bh | 5Ch | 5Dh 5Eh | 5Fh | 60h | 61h | 62h |
| 0.91 | 0.92 | 0.93 | 0.94 | 0.95 | 0.96 | 0.97 | 0.98 | 0.99 |
| 71h | 72h 73h | 74h | 75h | 76h 77h | 78h | 79h | 7Ah 7Bh | 7Ch |
| 1.11 | 1.12 | 1.13 | 1.14 | 1.15 | 1.16 | 1.17 | 1.18 | 1.19 |
| 8Bh | 8Ch 8Dh | 8Eh | 8Fh | 90h 91h | 92h | 93h | 94h | 95h |
| 1.31 | 1.32 | 1.33 | 1.34 | 1.35 | 1.36 | 1.37 | 1.38 | 1.39 |
| A4h | A5h A6h | A7h | A8h | A9h AAh | ABh | ACh | ADh AEh | AFh |
| 1.51 | 1.52 | 1.53 | 1.54 | 1.55 | 1.56 | 1.57 | 1.58 | 1.59 |
| BEh | BFh C0h | C1h | C2h | C3h C4h | C5h | C6h | C7h | C8h |
| 1.71 | 1.72 | 1.73 | 1.74 | 1.75 | 1.76 | 1.77 | 1.78 | 1.79 |
| D7h | D8h D9h | DAh | DBh | DCh DDh | DEh | DFh | E0h E1h | E2h |
| 1.91 | 1.92 | 1.93 | 1.94 | 1.95 | 1.96 | 1.97 | 1.98 | 1.99 |
| F1h | F2h F3h | F4h | F5h | F6h F7h | F8h | F9h | FAh | FBh |

FIG. 3

M2 CONVERSION MAP

| NORMAL VALUE \ MONITORED VALUE | 0.0 | 0.1 | 0.2 | 0.3 | 0.4 | 0.5 | 0.6 | 0.7 | 0.8 | 0.9 | 1.0 |
|---|---|---|---|---|---|---|---|---|---|---|---|
| 0.1(0Ah) REFER TO M2-1 | 0.00 00h | 0.01 01h | 0.02 02h | 0.03 03h | 0.04 04h | 0.05 05h | 0.06 06h | 0.07 07h | 0.08 08h | 0.09 09h | 0.10 0Ah |
| 0.2(17h-18h) REFER TO M2-2 | 0.00 00h 01h | 0.02 02h 03h | 0.04 04h 05h | 0.06 06h 07h | 0.08 08h 09h | 0.10 0Ah 0Bh | 0.12 0Ch -0Eh | 0.14 0Fh -11h | 0.16 12h 13h | 1.18 14h -16h | 0.20 17h 18h |
| 0.3(24h-27h) REFER TO M2-3 | 0.00 00h -02h | 0.03 03h -05h | 0.06 06h -08h | 0.09 09h -0Bh | 0.12 0Ch -0Fh | 0.15 10h -13h | 0.18 14h -17h | 0.21 18h -1Bh | 0.24 1Ch -1Fh | 0.27 20h -23h | 0.30 24h -27h |
| 0.4(30h-34h) REFER TO M2-4 | 0.00 00h -03h | 0.04 04h -07h | 0.08 08h -0Bh | 0.12 0Ch -11h | 0.16 12h -16h | 0.20 17h -1Bh | 0.24 1Ch -20h | 0.28 21h -25h | 0.32 26h -2Bh | 0.36 2Ch -2Fh | 0.40 30h -34h |
| 0.5(3Dh-42h) REFER TO M2-5 | 0.00 00h -04h | 0.05 05h -09h | 0.10 0Ah -0Fh | 0.15 10h -16h | 0.20 17h -1Eh | 0.25 1Fh -23h | 0.30 24h -29h | 0.35 2Ah -2Fh | 0.40 30h -35h | 0.45 36h -3Ch | 0.50 3Dh -42h |
| 0.6(4Ah-51h) REFER TO M2-6 | 0.00 00h -05h | 0.06 06h -0Bh | 0.12 0Ch -13h | 0.18 14h -1Bh | 0.24 1Ch -23h | 0.30 24h -2Bh | 0.36 2Ch -31h | 0.42 32h -39h | 0.48 3Ah -41h | 0.54 42h -49h | 0.60 4Ah -51h |
| 0.7(57h-5Fh) REFER TO M2-7 | 0.00 00h -06h | 0.07 07h -0Eh | 0.14 0Fh -17h | 0.21 18h -23h | 0.28 24h -29h | 0.35 2Ah -31h | 0.42 32h -3Bh | 0.49 3Ch -44h | 0.56 45h -4Dh | 0.63 4Eh -56h | 0.70 57h -5Fh |
| 0.8(63h-6Ch) REFER TO M2-8 | 0.00 00h -07h | 0.08 08h -11h | 0.16 12h -1Bh | 0.24 1Ch -25h | 0.32 26h -2Fh | 0.40 30h -3Ch | 0.48 3Dh -44h | 0.56 45h -4Eh | 0.64 4Fh -58h | 0.72 59h -62h | 0.80 63h -6Ch |
| 0.9(70h-7Bh) REFER TO M2-9 | 0.00 00h -08h | 0.09 09h -13h | 0.18 14h -1Fh | 0.27 20h -2Bh | 0.36 2Ch -35h | 0.45 36h -41h | 0.54 42h -4Dh | 0.63 4Eh -58h | 0.72 59h -63h | 0.81 64h -6Fh | 0.90 70h -7Bh |
| 1.0 | 0.00 00h -09h | 0.10 0Ah -16h | 0.20 17h -23h | 0.30 24h -2Fh | 0.40 30h -3Ch | 0.50 3Dh -49h | 0.60 4Ah -56h | 0.70 57h -62h | 0.80 63h -6Fh | 0.90 70h -7Ch | 1.00 7Dh -89h |

FIG. 4

M2 CONVERSION MAP

| MONTIORED VALUE / NORMAL VALUE | 1.1 | 1.2 | 1.3 | 1.4 | 1.5 | 1.6 | 1.7 | 1.8 | 1.9 | 2.0 | UN-KNOWN |
|---|---|---|---|---|---|---|---|---|---|---|---|
| 0.1 (0Ah) REFER TO M2-1 | 0.11 0Bh | 0.12 0Ch 0Dh | 0.13 0Eh | 0.14 0Fh | 0.15 10h 11h | 0.16 12h | 0.17 13h | 0.18 14h 15h | 0.19 16h | 0.20 17h | – 18h -FFh |
| 0.2 (17h-18h) REFER TO M2-2 | 0.22 19h -1Bh | 0.24 1Ch -1Eh | 0.26 1Fh 20h | 0.28 21h -23h | 0.30 24h 25h | 0.32 26h -28h | 0.34 29h -2Bh | 0.36 2Ch 2Dh | 0.38 2Eh 2Fh | 0.40 30h 31h | – 32h -FFh |
| 0.3 (24h-27h) REFER TO M2-3 | 0.33 28h -2Bh | 0.36 2Ch -2Eh | 0.39 2Fh -31h | 0.42 32h -35h | 0.45 36h -39h | 0.48 3Ah -3Dh | 0.51 3Eh -41h | 0.54 42h -45h | 0.57 46h -49h | 0.60 4Ah -4Dh | – 4Eh -FFh |
| 0.4 (30h-34h) REFER TO M2-4 | 0.44 35h -39h | 0.48 3Ah -3Eh | 0.52 3Fh -44h | 0.56 45h -49h | 0.60 4Ah -4Eh | 0.64 4Fh -53h | 0.68 54h -58h | 0.72 59h -5Eh | 0.76 5Fh -62h | 0.80 63h -67h | – 68h -FFh |
| 0.5 (3Dh-42h) REFER TO M2-5 | 0.55 43h -49h | 0.60 4Ah -4Fh | 0.65 50h -56h | 0.70 57h -5Ch | 0.75 5Dh -62h | 0.80 63h -68h | 0.85 69h -6Fh | 0.90 70h -75h | 0.95 76h -7Ch | 1.00 7Dh -82h | – 83h -FFh |
| 0.6 (4Ah-51h) REFER TO M2-6 | 0.66 52h -58h | 0.72 59h -60h | 0.78 61h -67h | 0.84 68h -6Fh | 0.90 70h -77h | 0.96 78h -7Eh | 1.02 7Fh -86h | 1.08 87h -8Eh | 1.14 8Fh -95h | 1.20 96h -9Ah | – 9Bh -FFh |
| 0.7 (57h-5Fh) REFER TO M2-7 | 0.77 60h -67h | 0.84 68h -70h | 0.91 71h -79h | 0.98 7Ah -82h | 1.05 83h -8Bh | 1.12 8Ch -94h | 1.19 95h -9Dh | 1.26 9Eh -A6h | 1.33 A7h -AFh | 1.40 B0h -B8h | – B9h -FFh |
| 0.8 (63h-6Ch) REFER TO M2-8 | 0.88 6Dh -77h | 0.96 78h -81h | 1.04 82h -8Bh | 1.12 8Ch -95h | 1.20 96h -9Fh | 1.28 A0h -AAh | 1.36 ABh -B4h | 1.44 B5h -BEh | 1.52 BFh -C8h | 1.60 C9h -D2h | – D3h -FFh |
| 0.9 (70h-7Bh) REFER TO M2-9 | 0.99 7Ch -86h | 1.08 87h -92h | 1.17 93h -9Dh | 1.26 9Eh -A8h | 1.35 A9h -B4h | 1.44 B5h -C0h | 1.53 C1h -CAh | 1.62 CBh -D6h | 1.71 D7h -E2h | 1.80 E3h -EEh | – EFh -FFh |
| 1.0 | 1.10 8Ah -95h | 1.20 96h -A2h | 1.30 A3h -AFh | 1.40 B0h -BCh | 1.50 BDh -C8h | 1.60 C9h -D5h | 1.70 D6h -E2h | 1.80 E3h -EFh | 1.90 F0h -FBh | 2.00 FCh -FFh | – |

FIG. 5

M2 CONVERSION MAP

| NORMAL VALUE \ MONITORED VALUE | 0.0 | 0.1 | 0.2 | 0.3 | 0.4 | 0.5 | 0.6 | 0.7 | 0.8 | 0.9 | 1.0 |
|---|---|---|---|---|---|---|---|---|---|---|---|
| 1.1 | 0.00 / 00h / -0Ah | 0.11 / 0Bh / -18h | 0.22 / 19h / -27h | 0.33 / 28h / -34h | 0.44 / 35h / -42h | 0.55 / 43h / -51h | 0.66 / 52h / -5Fh | 0.77 / 60h / -6Ch | 0.88 / 6Dh / -7Bh | 0.99 / 7Ch / -89h | 1.10 / 8Ah / -96h |
| 1.2 | 0.00 / 00h / -0Bh | 0.12 / 0Ch / -1Bh | 0.24 / 1Ch / -2Bh | 0.36 / 2Ch / -39h | 0.48 / 3Ah / -49h | 0.60 / 4Ah / -58h | 0.72 / 59h / -67h | 0.84 / 68h / -77h | 0.96 / 78h / -86h | 1.08 / 87h / -95h | 1.20 / 96h / -A4h |
| 1.3 | 0.00 / 00h / -0Dh | 0.13 / 0Eh / -1Eh | 0.26 / 1Fh / -2Eh | 0.39 / 2Fh / -3Eh | 0.52 / 3Fh / -4Fh | 0.65 / 50h / -60h | 0.78 / 61h / -70h | 0.91 / 71h / -81h | 1.04 / 82h / -92h | 1.17 / 93h / -A2h | 1.30 / A3h / -B3h |
| 1.4 | 0.00 / 00h / -0Eh | 0.14 / 0Fh / -20h | 0.28 / 21h / -31h | 0.42 / 32h / -44h | 0.56 / 45h / -56h | 0.70 / 57h / -67h | 0.84 / 68h / -79h | 0.98 / 7Ah / -8Bh | 1.12 / 8Ch / -9Dh | 1.26 / 9Eh / -AFh | 1.40 / B0h / -C1h |
| 1.5 | 0.00 / 00h / -0Fh | 0.15 / 10h / -23h | 0.30 / 24h / -35h | 0.45 / 36h / -49h | 0.60 / 4Ah / -5Ch | 0.75 / 5Dh / -6Fh | 0.90 / 70h / -82h | 1.05 / 83h / -95h | 1.20 / 96h / -A8h | 1.35 / A9h / -BCh | 1.50 / BDh / -CEh |
| 1.6 | 0.00 / 00h / -11h | 0.16 / 12h / -25h | 0.32 / 26h / -39h | 0.48 / 3Ah / -4Eh | 0.64 / 4Fh / -62h | 0.80 / 63h / -77h | 0.96 / 78h / -8Bh | 1.12 / 8Ch / -9Fh | 1.28 / A0h / -B4h | 1.44 / B5h / -C8h | 1.60 / C9h / -DDh |
| 1.7 | 0.00 / 00h / -12h | 0.17 / 13h / -28h | 0.34 / 29h / -3Dh | 0.51 / 3Eh / -53h | 0.68 / 54h / -68h | 0.85 / 69h / -7Eh | 1.02 / 7Fh / -94h | 1.19 / 95h / -AAh | 1.36 / ABh / -C0h | 1.53 / C1h / -D5h | 1.70 / D6h / -EBh |
| 1.8 | 0.00 / 00h / -13h | 0.18 / 14h / -2Bh | 0.36 / 2Ch / -41h | 0.54 / 42h / -58h | 0.72 / 59h / -6Fh | 0.90 / 70h / -86h | 1.08 / 87h / -9Dh | 1.26 / 9Eh / -B4h | 1.44 / B5h / -CAh | 1.62 / CBh / -E2h | 1.80 / E3h / -F9h |
| 1.9 | 0.00 / 00h / -15h | 0.19 / 16h / -2Dh | 0.38 / 2Eh / -45h | 0.57 / 46h / -5Eh | 0.76 / 5Fh / -75h | 0.95 / 76h / -8Eh | 1.14 / 8Fh / -A6h | 1.33 / A7h / -BEh | 1.52 / BFh / -D6h | 1.71 / D7h / -EFh | 1.90 / F0h / -FFh |
| 2.0 | 0.00 / 00h / -16h | 0.20 / 17h / -2Fh | 0.40 / 30h / -49h | 0.60 / 4Ah / -62h | 0.80 / 63h / -7Ch | 1.00 / 7Dh / -95h | 1.20 / 96h / -AFh | 1.40 / B0h / -C8h | 1.60 / C9h / -E2h | 1.80 / E3h / -FBh | 2.00 / FCh / -FFh |

FIG. 6

M2 CONVERSION MAP

| NORMAL VALUE \ MONITORED VALUE | 1.1 | 1.2 | 1.3 | 1.4 | 1.5 | 1.6 | 1.7 | 1.8 | 1.9 | 2.0 |
|---|---|---|---|---|---|---|---|---|---|---|
| 1.1 | 1.21<br>97h<br>-A4h | 1.32<br>A5h<br>-B3h | 1.43<br>B4h<br>-C1h | 1.54<br>C2h<br>-CEh | 1.65<br>CFh<br>-DDh | 1.76<br>DEh<br>-EBh | 1.87<br>ECh<br>-F9h | 1.98<br>FAh<br>-FFh | >2.00<br>- | >2.00<br>- |
| 1.2 | 1.32<br>A5h<br>-B4h | 1.44<br>B5h<br>-C4h | 1.56<br>C5h<br>-D2h | 1.68<br>D3h<br>-E2h | 1.80<br>E3h<br>-F1h | 1.92<br>F2h<br>-FFh | >2.00<br>- | >2.00<br>- | >2.00<br>- | >2.00<br>- |
| 1.3 | 1.43<br>B4h<br>-C4h | 1.56<br>C5h<br>-D4h | 1.69<br>D5h<br>-E4h | 1.82<br>E5h<br>-F5h | 1.95<br>F6h<br>-FFh | >2.00<br>- | >2.00<br>- | >2.00<br>- | >2.00<br>- | >2.00<br>- |
| 1.4 | 1.54<br>C2h<br>-D2h | 1.68<br>D3h<br>-E4h | 1.82<br>E5h<br>-F7h | 1.96<br>F8h<br>-FFh | >2.00<br>- | >2.00<br>- | >2.00<br>- | >2.00<br>- | >2.00<br>- | >2.00<br>- |
| 1.5 | 1.65<br>CFh<br>-E2h | 1.80<br>E3h<br>-F5h | 1.95<br>F6h<br>-FFh | >2.00<br>- | >2.00<br>- | >2.00<br>- | >2.00<br>- | >2.00<br>- | >2.00<br>- | >2.00<br>- |
| 1.6 | 1.76<br>DEh<br>-F1h | 1.92<br>F2h<br>-FFh | >2.00<br>- | >2.00<br>- | >2.00<br>- | >2.00<br>- | >2.00<br>- | >2.00<br>- | >2.00<br>- | >2.00<br>- |
| 1.7 | 1.87<br>ECh<br>-FFh | >2.00<br>- | >2.00<br>- | >2.00<br>- | >2.00<br>- | >2.00<br>- | >2.00<br>- | >2.00<br>- | >2.00<br>- | >2.00<br>- |
| 1.8 | 1.98<br>FAh<br>-FFh | >2.00<br>- | >2.00<br>- | >2.00<br>- | >2.00<br>- | >2.00<br>- | >2.00<br>- | >2.00<br>- | >2.00<br>- | >2.00<br>- |
| 1.9 | >2.00<br>- | >2.00<br>- | >2.00<br>- | >2.00<br>- | >2.00<br>- | >2.00<br>- | >2.00<br>- | >2.00<br>- | >2.00<br>- | >2.00<br>- |
| 2.0 | >2.00<br>- | >2.00<br>- | >2.00<br>- | >2.00<br>- | >2.00<br>- | >2.00<br>- | >2.00<br>- | >2.00<br>- | >2.00<br>- | >2.00<br>- |

FIG. 7

M2-1 CONVERSION MAP

| MONITORED VALUE → <br> ↓ NORMAL VALUE | 0.0 | 0.1 | 0.2 | 0.3 | 0.4 | 0.5 | 0.6 | 0.7 | 0.8 | 0.9 | 1.0 |
|---|---|---|---|---|---|---|---|---|---|---|---|
| 0.1(0Ah) | 0.00 / 00h | 0.01 / 01h | 0.02 / 02h | 0.03 / 03h | 0.04 / 04h | 0.05 / 05h | 0.06 / 06h | 0.07 / 07h | 0.08 / 08h | 0.09 / 09h | 0.10 / 0Ah |
| 0.1(0Bh) | 0.00 / 00h | 0.01 / 01h | 0.02 / 02h | 0.03 / 03h | 0.04 / 04h | 0.05 / 05h | 0.06 / 06h | 0.07 / 07h | 0.08 / 08h | 0.09 / 09h 0Ah | 0.11 / 0Bh |
| 0.1(0Ch, 0Dh) | 0.00 / 00h | 0.01 / 01h | 0.02 / 02h | 0.03 / 03h | 0.04 / 04h 05h | 0.06 / 06h | 0.07 / 07h | 0.08 / 08h | 0.09 / 09h | 0.10 / 0Ah 0Bh | 0.12 / 0Ch 0Dh |
| 0.1(0Eh) | 0.00 / 00h | 0.01 / 01h | 0.02 / 02h | 0.03 / 03h 04h | 0.05 / 05h | 0.06 / 06h | 0.07 / 07h 08h | 0.09 / 09h | 0.10 / 0Ah | 0.11 / 0Bh −0Dh | 0.13 / 0Eh |
| 0.1(0Fh) | 0.00 / 00h | 0.01 / 01h | 0.02 / 02h 03h | 0.04 / 04h | 0.05 / 05h 06h | 0.07 / 07h | 0.08 / 08h | 0.09 / 09h 0Ah | 0.11 / 0Bh | 0.12 / 0Ch −0Eh | 0.14 / 0Fh |
| 0.1(10h, 11h) | 0.00 / 00h | 0.01 / 01h 02h | 0.03 / 03h | 0.04 / 04h 05h | 0.06 / 06h | 0.07 / 07h 08h | 0.09 / 09h | 0.10 / 0Ah 0Bh | 0.12 / 0Ch 0Dh | 0.13 / 0Eh 0Fh | 0.15 / 10h 11h |
| 0.1(12h) | 0.00 / 00h | 0.01 / 01h 02h | 0.03 / 03h | 0.04 / 04h 05h | 0.06 / 06h 07h | 0.08 / 08h | 0.09 / 09h 0Ah | 0.11 / 0Bh | 0.12 / 0Ch −0Eh | 0.14 / 0Fh −11h | 0.16 / 12h |
| 0.1(13h) | 0.00 / 00h | 0.01 / 01h 02h | 0.03 / 03h 04h | 0.05 / 05h | 0.06 / 06h 07h | 0.08 / 08h 09h | 0.10 / 0Ah | 0.11 / 0Bh −0Dh | 0.13 / 0Eh 0Fh | 0.15 / 10h −12h | 0.17 / 13h |
| 0.1(14h, 15h) | 0.00 / 00h | 0.01 / 01h 02h | 0.03 / 03h 04h | 0.05 / 05h 06h | 0.07 / 07h 08h | 0.09 / 09h | 0.10 / 0Ah 0Bh | 0.12 / 0Ch −0Eh | 0.14 / 0Fh −11h | 0.16 / 12h 13h | 0.18 / 14h 15h |
| 0.1(16h) | 0.00 / 00h | 0.01 / 01h 02h | 0.03 / 03h 04h | 0.05 / 05h 06h | 0.07 / 07h 08h | 0.09 / 09h 0Ah | 0.11 / 0Bh −0Dh | 0.13 / 0Eh | 0.15 / 10h −12h | 0.17 / 13h −15h | 0.19 / 16h |

FIG. 8

M2-1 CONVERSION MAP

| MONITORED VALUE / NORMAL VALUE | 1.1 | 1.2 | 1.3 | 1.4 | 1.5 | 1.6 | 1.7 | 1.8 | 1.9 | 2.0 | UN-KNOWN |
|---|---|---|---|---|---|---|---|---|---|---|---|
| 0.1(0Ah) | 0.11<br>0Bh | 0.12<br>0Ch<br>0Dh | 0.13<br>0Eh | 0.14<br>0Fh | 0.15<br>10h<br>11h | 0.16<br>12h | 0.17<br>13h | 0.18<br>14h<br>15h | 0.19<br>16h | 0.20<br>17h | –<br>18h<br>–FFh |
| 0.1(0Bh) | 0.12<br>0Ch<br>0Dh | 0.13<br>0Eh | 0.14<br>0Fh | 0.15<br>10h<br>11h | 0.16<br>12h | 0.17<br>13h | 0.18<br>14h<br>15h | 0.19<br>16h | 0.20<br>17h<br>18h | 0.22<br>19h<br>1Ah | –<br>1Bh<br>–FFh |
| 0.1(0Ch,0Dh) | 0.11<br>0Eh | 0.12<br>0Fh | 0.13<br>10h<br>11h | 0.14<br>12h<br>13h | 0.15<br>14h<br>15h | 0.16<br>16h | 0.17<br>17h | 0.18<br>18h | 0.19<br>19h<br>–1Bh | 0.20<br>1Ch | –<br>1Dh<br>–FFh |
| 0.1(0Eh) | 0.14<br>0Fh | 0.15<br>10h<br>11h | 0.16<br>12h | 0.18<br>14h<br>15h | 0.19<br>16h | 0.20<br>17h<br>18h | 0.22<br>19h<br>1Ah | 0.23<br>1Bh | 0.24<br>1Ch<br>–1Eh | 0.26<br>1Fh | –<br>20h<br>–FFh |
| 0.1(0Fh) | 0.15<br>10h<br>11h | 0.16<br>12h<br>13h | 0.18<br>14h<br>15h | 0.19<br>16h<br>17h | 0.21<br>18h | 0.22<br>19h<br>1Ah | 0.23<br>1Bh<br>1Ch | 0.25<br>1Dh<br>1Eh | 0.26<br>1Fh<br>20h | 0.28<br>21h<br>22h | –<br>23h<br>–FFh |
| 0.1(10h,11h) | 0.16<br>12h<br>13h | 0.18<br>14h<br>15h | 0.19<br>16h<br>17h | 0.21<br>18h | 0.22<br>19h<br>–1Bh | 0.24<br>1Ch | 0.25<br>1Dh<br>–1Fh | 0.27<br>20h | 0.28<br>21h<br>–23h | 0.30<br>24h | –<br>25h<br>–FFh |
| 0.1(12h) | 0.17<br>13h<br>–15h | 0.19<br>16h | 0.20<br>17h<br>18h | 0.22<br>19h<br>–1Bh | 0.24<br>1Ch | 0.25<br>1Dh<br>–1Fh | 0.27<br>20h | 0.28<br>21h<br>–23h | 0.30<br>24h<br>25h | 0.32<br>26h<br>27h | –<br>28h<br>–FFh |
| 0.1(13h) | 0.18<br>14h<br>–16h | 0.20<br>17h<br>18h | 0.22<br>19h<br>1Ah | 0.23<br>1Bh<br>1Ch | 0.25<br>1Dh<br>–1Fh | 0.27<br>20h | 0.28<br>21h<br>–23h | 0.30<br>24h<br>25h | 0.32<br>26h<br>–28h | 0.34<br>29h | –<br>2Ah<br>–FFh |
| 0.1(14h,15h) | 0.19<br>16h<br>17h | 0.21<br>18h<br>–1Ah | 0.23<br>1Bh<br>1Ch | 0.25<br>1Dh<br>–1Fh | 0.27<br>20h | 0.28<br>21h<br>–23h | 0.30<br>24h<br>25h | 0.32<br>26h<br>–28h | 0.34<br>29h<br>–2Bh | 0.36<br>2Ch | –<br>2Dh<br>–FFh |
| 0.1(16h) | 0.20<br>17h<br>18h | 0.22<br>19h<br>–1Bh | 0.24<br>1Ch<br>–1Eh | 0.26<br>1Fh<br>20h | 0.28<br>21h<br>–23h | 0.30<br>24h<br>25h | 0.32<br>26h<br>–28h | 0.34<br>29h<br>–2Bh | 0.36<br>2Ch<br>2Dh | 0.38<br>2Eh<br>2Fh | –<br>30h<br>–FFh |

FIG. 9

M2-2 CONVERSION MAP

| MONITORED VALUE / NORMAL VALUE | 0.0 | 0.1 | 0.2 | 0.3 | 0.4 | 0.5 | 0.6 | 0.7 | 0.8 | 0.9 | 1.0 |
|---|---|---|---|---|---|---|---|---|---|---|---|
| 0.2(17h-18h) | 0.00 00h 01h | 0.02 02h 03h | 0.04 04h 05h | 0.06 06h 07h | 0.08 08h 09h | 0.10 0Ah 0Bh | 0.12 0Ch -0Eh | 0.14 0Fh -11h | 0.16 12h 13h | 0.18 14h -16h | 0.20 17h 18h |
| 0.2(19h-1Bh) | 0.00 00h 01h | 0.02 02h 03h | 0.04 04h 05h | 0.06 06h 07h | 0.08 08h -0Ah | 0.11 0Bh -0Dh | 0.13 0Eh 0Fh | 0.15 10h -12h | 0.17 13h -15h | 0.19 16h -18h | 0.22 19h -1Bh |
| 0.2(1Ch-1Eh) | 0.00 00h 01h | 0.02 02h 03h | 0.04 04h -06h | 0.07 07h 08h | 0.09 09h -0Bh | 0.12 0Ch -0Eh | 0.14 0Fh -11h | 0.16 12h -15h | 0.19 16h 17h | 0.21 18h -1Bh | 0.24 1Ch -1Eh |
| 0.2(1Fh-20h) | 0.00 00h 01h | 0.02 02h -04h | 0.05 05h 06h | 0.07 07h -09h | 0.10 0Ah -0Dh | 0.13 0Eh 0Fh | 0.15 10h -13h | 0.18 14h -16h | 0.20 17h -1Ah | 0.23 1Bh -1Eh | 0.26 1Fh 20h |
| 0.2(21h-23h) | 0.00 00h 01h | 0.02 02h -04h | 0.05 05h -07h | 0.08 08h -0Ah | 0.11 0Bh -0Dh | 0.14 0Fh -11h | 0.16 12h -15h | 0.19 16h -18h | 0.22 19h -1Ch | 0.25 1Dh -20h | 0.28 21h -23h |

FIG. 10

M2-2 CONVERSION MAP

| MONITORED VALUE / NORMAL VALUE | 1.1 | 1.2 | 1.3 | 1.4 | 1.5 | 1.6 | 1.7 | 1.8 | 1.9 | 2.0 | UN-KNOWN |
|---|---|---|---|---|---|---|---|---|---|---|---|
| 0.2(17h–18h) | 0.22<br>19h<br>–1Bh | 0.24<br>1Ch<br>–1Eh | 0.26<br>1Fh<br>20h | 0.28<br>21h<br>–23h | 0.30<br>24h<br>25h | 0.32<br>26h<br>–28h | 0.34<br>29h<br>–2Bh | 0.36<br>2Ch<br>2Dh | 0.38<br>2Eh<br>2Fh | 0.40<br>30h<br>31h | –<br>32h<br>–FFh |
| 0.2(19h–1Bh) | 0.24<br>1Ch<br>–1Eh | 0.26<br>1Fh<br>20h | 0.28<br>21h<br>–23h | 0.30<br>24h<br>–27h | 0.33<br>28h<br>29h | 0.35<br>2Ah<br>–2Ch | 0.37<br>2Dh<br>2Eh | 0.39<br>2Fh<br>30h | 0.41<br>31h<br>–34h | 0.44<br>35h<br>–37h | –<br>38h<br>–FFh |
| 0.2(1Ch–1Eh) | 0.26<br>1Fh<br>20h | 0.28<br>21h<br>–24h | 0.31<br>25h<br>–27h | 0.33<br>28h<br>–2Bh | 0.36<br>2Ch<br>2Dh | 0.38<br>2Eh<br>2Fh | 0.40<br>30h<br>–33h | 0.43<br>34h<br>35h | 0.45<br>36h<br>–39h | 0.48<br>3Ah<br>–3Ch | –<br>3Dh<br>–FFh |
| 0.2(1Fh–20h) | 0.28<br>21h<br>–24h | 0.31<br>25h<br>–27h | 0.33<br>28h<br>–2Bh | 0.36<br>2Ch<br>–2Eh | 0.39<br>2Fh<br>30h | 0.41<br>31h<br>–34h | 0.44<br>35h<br>–37h | 0.46<br>38h<br>–3Bh | 0.49<br>3Ch<br>–3Eh | 0.52<br>3Fh<br>–41h | –<br>42h<br>–FFh |
| 0.2(21h–23h) | 0.30<br>24h<br>–27h | 0.33<br>28h<br>–2Bh | 0.36<br>2Ch<br>–2Eh | 0.39<br>2Fh<br>–31h | 0.42<br>32h<br>–34h | 0.44<br>35h<br>–38h | 0.47<br>39h<br>–3Ch | 0.50<br>3Dh<br>–40h | 0.53<br>41h<br>–44h | 0.56<br>45h<br>46h | –<br>47h<br>–FFh |

FIG. 11

M2-3 CONVERSION MAP

| MONTORED VALUE / NORMAL VALUE | 0.0 | 0.1 | 0.2 | 0.3 | 0.4 | 0.5 | 0.6 | 0.7 | 0.8 | 0.9 | 1.0 |
|---|---|---|---|---|---|---|---|---|---|---|---|
| 0.3(24h-27h) | 0.00<br>00h<br>-02h | 0.03<br>03h<br>-05h | 0.06<br>06h<br>-08h | 0.09<br>09h<br>-0Bh | 0.12<br>0Ch<br>-0Fh | 0.15<br>10h<br>-13h | 0.18<br>14h<br>-17h | 0.21<br>18h<br>-1Bh | 0.24<br>1Ch<br>-1Fh | 0.27<br>20h<br>-23h | 0.30<br>24h<br>-27h |
| 0.3(28h-2Bh) | 0.00<br>00h<br>-02h | 0.03<br>03h<br>-05h | 0.06<br>06h<br>-08h | 0.09<br>09h<br>-0Dh | 0.13<br>0Eh<br>-11h | 0.16<br>12h<br>-15h | 0.19<br>16h<br>-1Ah | 0.23<br>1Bh<br>-1Eh | 0.26<br>1Fh<br>-22h | 0.29<br>23h<br>-27h | 0.33<br>28h<br>-2Bh |
| 0.3(2Ch-2Eh) | 0.00<br>00h<br>-02h | 0.03<br>03h<br>-06h | 0.07<br>07h<br>-09h | 0.10<br>0Ah<br>-0Eh | 0.14<br>0Fh<br>-13h | 0.18<br>14h<br>-17h | 0.21<br>18h<br>-1Ch | 0.25<br>1Dh<br>-20h | 0.28<br>21h<br>-25h | 0.32<br>26h<br>-2Bh | 0.36<br>2Ch<br>-2Eh |
| 0.3(2Fh) | 0.00<br>00h<br>-02h | 0.03<br>03h<br>-06h | 0.07<br>07h<br>-0Ah | 0.11<br>0Bh<br>-0Fh | 0.15<br>10h<br>-15h | 0.19<br>16h<br>-1Ah | 0.23<br>1Bh<br>-1Fh | 0.27<br>20h<br>-24h | 0.31<br>25h<br>-29h | 0.35<br>2Ah<br>-2Eh | 0.39<br>2Fh<br>-31h |

FIG. 12

M2-3 CONVERSION MAP

| NORMAL VALUE \ MONITORED VALUE | 1.1 | 1.2 | 1.3 | 1.4 | 1.5 | 1.6 | 1.7 | 1.8 | 1.9 | 2.0 | UN-KNOWN |
|---|---|---|---|---|---|---|---|---|---|---|---|
| 0.3(24h-27h) | 0.33 | 0.36 | 0.39 | 0.42 | 0.45 | 0.48 | 0.51 | 0.54 | 0.57 | 0.60 | – |
| | 28h -2Bh | 2Ch -2Eh | 2Fh -31h | 32h -35h | 36h -39h | 3Ah -3Dh | 3Eh -41h | 42h -45h | 46h -49h | 4Ah -4Dh | 4Eh -FFh |
| 0.3(28h-2Bh) | 0.36 | 0.39 | 0.42 | 0.46 | 0.49 | 0.52 | 0.56 | 0.59 | 0.62 | 0.66 | – |
| | 2Ch -2Eh | 2Fh -31h | 32h -37h | 38h -3Bh | 3Ch -3Eh | 3Fh -44h | 45h -48h | 49h -4Bh | 4Ch -51h | 52h -55h | 56h -FFh |
| 0.3(2Ch-2Eh) | 0.39 | 0.43 | 0.46 | 0.50 | 0.54 | 0.57 | 0.61 | 0.64 | 0.68 | 0.72 | – |
| | 2Fh -33h | 34h -37h | 38h -3Ch | 3Dh -41h | 42h -45h | 46h -4Ah | 4Bh -4Eh | 4Fh -53h | 54h -58h | 59h -5Ch | 5Dh -FFh |
| 0.3(2Fh) | 0.42 | 0.46 | 0.50 | 0.54 | 0.58 | 0.62 | 0.66 | 0.70 | 0.74 | 0.78 | – |
| | 32h -37h | 38h -3Ch | 3Dh -41h | 42h -46h | 47h -4Bh | 4Ch -51h | 52h -56h | 57h -5Bh | 5Ch -60h | 61h -63h | 64h -FFh |

FIG. 13

M2-4  CONVERSION MAP

| MONITORED VALUE / NORMAL VALUE | 0.0 | 0.1 | 0.2 | 0.3 | 0.4 | 0.5 | 0.6 | 0.7 | 0.8 | 0.9 | 1.0 |
|---|---|---|---|---|---|---|---|---|---|---|---|
| 0.4(30h-34h) | 0.00<br>00h<br>-03h | 0.04<br>04h<br>-07h | 0.08<br>08h<br>-0Bh | 0.12<br>0Ch<br>-11h | 0.16<br>12h<br>-16h | 0.20<br>17h<br>-1Bh | 0.24<br>1Ch<br>-20h | 0.28<br>21h<br>-25h | 0.32<br>26h<br>-2Bh | 0.36<br>2Ch<br>-2Fh | 0.40<br>30h<br>-34h |
| 0.4(35h-39h) | 0.00<br>00h<br>-03h | 0.04<br>04h<br>-07h | 0.08<br>08h<br>-0Dh | 0.13<br>0Eh<br>-12h | 0.17<br>13h<br>-18h | 0.22<br>19h<br>-1Eh | 0.26<br>1Fh<br>-23h | 0.30<br>24h<br>-29h | 0.35<br>2Ah<br>-2Eh | 0.39<br>2Fh<br>-34h | 0.44<br>35h<br>-39h |
| 0.4(3Ah-3Ch) | 0.00<br>00h<br>-03h | 0.04<br>04h<br>-08h | 0.09<br>09h<br>-0Eh | 0.14<br>0Fh<br>-15h | 0.19<br>16h<br>-1Bh | 0.24<br>1Ch<br>-20h | 0.28<br>21h<br>-27h | 0.33<br>28h<br>-2Dh | 0.38<br>2Eh<br>-33h | 0.43<br>34h<br>-39h | 0.48<br>3Ah<br>-3Eh |

FIG. 14

M2-4 CONVERSION MAP

| MONITORED VALUE / NORMAL VALUE | 1.1 | 1.2 | 1.3 | 1.4 | 1.5 | 1.6 | 1.7 | 1.8 | 1.9 | 2.0 | UN-KNOWN |
|---|---|---|---|---|---|---|---|---|---|---|---|
| 0.4(30h-34h) | 0.44<br>35h<br>-39h | 0.48<br>3Ah<br>-3Eh | 0.52<br>3Fh<br>-44h | 0.56<br>45h<br>-49h | 0.60<br>4Ah<br>-4Eh | 0.64<br>4Fh<br>-53h | 0.68<br>54h<br>-58h | 0.72<br>59h<br>-5Eh | 0.76<br>5Fh<br>-62h | 0.80<br>63h<br>-67h | –<br>68h<br>-FFh |
| 0.4(35h-39h) | 0.48<br>3Ah<br>-3Eh | 0.52<br>3Fh<br>-45h | 0.57<br>46h<br>-4Ah | 0.61<br>4Bh<br>-51h | 0.66<br>52h<br>-56h | 0.64<br>57h<br>-5Bh | 0.74<br>5Ch<br>-61h | 0.79<br>62h<br>-66h | 0.83<br>67h<br>-6Ch | 0.88<br>6Dh<br>-71h | –<br>72h<br>-FFh |
| 0.4(3Ah-3Ch) | 0.52<br>3Fh<br>-45h | 0.57<br>46h<br>-4Bh | 0.62<br>4Ch<br>-52h | 0.67<br>53h<br>-58h | 0.72<br>59h<br>-5Eh | 0.76<br>5Fh<br>-63h | 0.81<br>64h<br>-6Ah | 0.86<br>6Bh<br>-70h | 0.91<br>71h<br>-77h | 0.96<br>78h<br>-7Ch | –<br>7Dh<br>-FFh |

FIG. 15

M2-5 CONVERSION MAP

| MONITORED VALUE / NORMAL VALUE | 0.0 | 0.1 | 0.2 | 0.3 | 0.4 | 0.5 | 0.6 | 0.7 | 0.8 | 0.9 | 1.0 |
|---|---|---|---|---|---|---|---|---|---|---|---|
| 0.5(3Dh-42h) | 0.00 00h -04h | 0.05 05h -09h | 0.10 0Ah -0Fh | 0.15 10h -16h | 0.20 17h -1Eh | 0.25 1Fh -23h | 0.30 24h -29h | 0.35 2Ah -2Fh | 0.40 30h -35h | 0.45 36h -3Ch | 0.50 3Dh -42h |
| 0.5(43h-49h) | 0.00 00h -04h | 0.05 05h -0Ah | 0.11 0Bh -11h | 0.16 12h -18h | 0.22 19h -1Fh | 0.27 20h -27h | 0.33 28h -2Dh | 0.38 2Eh -34h | 0.44 35h -3Bh | 0.49 3Ch -42h | 0.55 43h -49h |

FIG. 16

M2-5 CONVERSION MAP

| MONITORED VALUE / NORMAL VALUE | 1.1 | 1.2 | 1.3 | 1.4 | 1.5 | 1.6 | 1.7 | 1.8 | 1.9 | 2.0 | UN-KNOWN |
|---|---|---|---|---|---|---|---|---|---|---|---|
| 0.5(3Dh-42h) | 0.55<br>43h<br>-49h | 0.60<br>4Ah<br>-4Fh | 0.65<br>50h<br>-56h | 0.70<br>57h<br>-5Ch | 0.75<br>5Dh<br>-62h | 0.80<br>63h<br>-68h | 0.85<br>69h<br>-6Fh | 0.90<br>70h<br>-75h | 0.95<br>76h<br>-7Ch | 1.00<br>7Dh<br>-82h | –<br>83h<br>-FFh |
| 0.5(43h-49h) | 0.60<br>4Ah<br>-51h | 0.66<br>52h<br>-57h | 0.71<br>58h<br>-5Fh | 0.77<br>60h<br>-64h | 0.82<br>65h<br>-6Ch | 0.88<br>6Dh<br>-73h | 0.93<br>74h<br>-7Bh | 0.99<br>7Ch<br>-81h | 1.04<br>82h<br>-89h | 1.10<br>8Ah<br>-8Fh | –<br>90h<br>-FFh |

FIG. 17

M2-6  CONVERSION MAP

| MONITORED VALUE / NORMAL VALUE | 0.0 | 0.1 | 0.2 | 0.3 | 0.4 | 0.5 | 0.6 | 0.7 | 0.8 | 0.9 | 1.0 |
|---|---|---|---|---|---|---|---|---|---|---|---|
| 0.6(4Ah-51h) | 0.00<br>00h<br>-05h | 0.06<br>06h<br>-0Bh | 0.12<br>0Ch<br>-13h | 0.18<br>14h<br>-1Bh | 0.24<br>1Ch<br>-23h | 0.30<br>24h<br>-2Bh | 0.36<br>2Ch<br>-31h | 0.42<br>32h<br>-39h | 0.48<br>3Ah<br>-41h | 0.54<br>42h<br>-49h | 0.60<br>4Ah<br>-51h |
| 0.6(52h-56h) | 0.00<br>00h<br>-05h | 0.06<br>06h<br>-0Ch | 0.13<br>0Eh<br>-15h | 0.19<br>16h<br>-1Eh | 0.26<br>1Fh<br>-27h | 0.33<br>28h<br>-2Eh | 0.39<br>2Fh<br>-37h | 0.46<br>38h<br>-3Eh | 0.52<br>3Fh<br>-48h | 0.59<br>49h<br>-51h | 0.66<br>52h<br>-58h |

FIG. 18

M2-6 CONVERSION MAP

| MONITORED VALUE / NORMAL VALUE | 1.1 | 1.2 | 1.3 | 1.4 | 1.5 | 1.6 | 1.7 | 1.8 | 1.9 | 2.0 | UN-KNOWN |
|---|---|---|---|---|---|---|---|---|---|---|---|
| 0.6(4Ah-51h) | 0.66 | 0.72 | 0.78 | 0.84 | 0.90 | 0.96 | 1.02 | 1.08 | 1.14 | 1.20 | – |
|  | 52h-58h | 59h-60h | 61h-67h | 68h-6Fh | 70h-77h | 78h-7Eh | 7Fh-86h | 87h-8Eh | 8Eh-95h | 96h-9Ah | 9Bh-FFh |
| 0.6(52h-56h) | 0.72 | 0.79 | 0.85 | 0.92 | 0.99 | 1.05 | 1.12 | 1.18 | 1.25 | 1.32 | – |
|  | 59h-61h | 62h-68h | 69h-71h | 72h-7Bh | 7Ch-82h | 83h-8Bh | 8Ch-93h | 94h-9Bh | 9Ch-A4h | A5h-ACh | ADh-FFh |

FIG. 19

M2-7 CONVERSION MAP

| MONITORED VALUE<br>NORMAL VALUE | 0.0 | 0.1 | 0.2 | 0.3 | 0.4 | 0.5 | 0.6 | 0.7 | 0.8 | 0.9 | 1.0 |
|---|---|---|---|---|---|---|---|---|---|---|---|
| 0.7(57h-5Fh) | 0.00<br>00h<br>-06h | 0.07<br>07h<br>-0Eh | 0.14<br>0Fh<br>-17h | 0.21<br>18h<br>-23h | 0.28<br>24h<br>-29h | 0.35<br>2Ah<br>-31h | 0.42<br>32h<br>-3Bh | 0.49<br>3Ch<br>-44h | 0.56<br>45h<br>-4Dh | 0.63<br>4Eh<br>-56h | 0.70<br>57h<br>-5Fh |
| 0.7(60h-62h) | 0.00<br>00h<br>-06h | 0.07<br>07h<br>-0Fh | 0.15<br>10h<br>-1Ah | 0.23<br>1Bh<br>-23h | 0.30<br>24h<br>-2Dh | 0.38<br>2Eh<br>-37h | 0.46<br>38h<br>-40h | 0.53<br>41h<br>-4Ah | 0.61<br>4Bh<br>-55h | 0.69<br>56h<br>-5Fh | 0.77<br>60h<br>-67h |

FIG. 20

M2-7 CONVERSION MAP

| MONITORED VALUE / NORMAL VALUE | 1.1 | 1.2 | 1.3 | 1.4 | 1.5 | 1.6 | 1.7 | 1.8 | 1.9 | 2.0 | UN-KNOWN |
|---|---|---|---|---|---|---|---|---|---|---|---|
| 0.7(57h-5Fh) | 0.77<br>60h<br>-67h | 0.84<br>68h<br>-70h | 0.91<br>71h<br>-79h | 0.98<br>7Ah<br>-82h | 1.05<br>83h<br>-8Bh | 1.12<br>8Ch<br>-94h | 1.19<br>95h<br>-9Dh | 1.26<br>9Eh<br>-A6h | 1.33<br>A7h<br>-AFh | 1.40<br>B0h<br>-B8h | –<br>B9h<br>-FFh |
| 0.7(60h-62h) | 0.84<br>68h<br>-71h | 0.92<br>72h<br>-7Ch | 1.00<br>7Dh<br>-85h | 1.07<br>86h<br>-8Fh | 1.15<br>90h<br>-99h | 1.23<br>9Ah<br>-A2h | 1.30<br>A3h<br>-ACh | 1.38<br>ADh<br>-B7h | 1.46<br>B8h<br>-C1h | 1.54<br>C2h<br>-C9h | –<br>CAh<br>-FFh |

FIG. 21

M2-8 CONVERSION MAP

| MONITORED VALUE / NORMAL VALUE | 0.0 | 0.1 | 0.2 | 0.3 | 0.4 | 0.5 | 0.6 | 0.7 | 0.8 | 0.9 | 1.0 |
|---|---|---|---|---|---|---|---|---|---|---|---|
| 0.8(63h–6Ch) | 0.00<br>00h<br>–07h | 0.08<br>08h<br>–11h | 0.16<br>12h<br>–1Bh | 0.24<br>1Ch<br>–25h | 0.32<br>26h<br>–2Fh | 0.40<br>30h<br>–3Ch | 0.48<br>3Dh<br>–44h | 0.56<br>45h<br>–4Eh | 0.64<br>4Fh<br>–58h | 0.72<br>59h<br>–62h | 0.80<br>63h<br>–6Ch |
| 0.8(6Dh–6Fh) | 0.00<br>00h<br>–07h | 0.08<br>08h<br>–12h | 0.17<br>13h<br>–1Eh | 0.26<br>1Fh<br>–29h | 0.35<br>2Ah<br>–34h | 0.44<br>35h<br>–3Eh | 0.52<br>3Fh<br>–4Ah | 0.61<br>4Bh<br>–56h | 0.70<br>57h<br>–61h | 0.79<br>62h<br>–6Ch | 0.88<br>6Dh<br>–77h |

FIG. 22

M2-8 CONVERSION MAP

| MONITORED VALUE \ NORMAL VALUE | 1.1 | 1.2 | 1.3 | 1.4 | 1.5 | 1.6 | 1.7 | 1.8 | 1.9 | 2.0 | UN-KNOWN |
|---|---|---|---|---|---|---|---|---|---|---|---|
| 0.8(63h-6Ch) | 0.88 | 0.96 | 1.04 | 1.12 | 1.20 | 1.28 | 1.36 | 1.44 | 1.52 | 1.60 | – |
| | 6Dh -77h | 78h -81h | 82h -8Bh | 8Ch -95h | 96h -9Fh | A0h -AAh | ABh -B4h | B5h -BEh | BFh -C8h | C9h -D2h | D3h -FFh |
| 0.8(6Dh-6Fh) | 0.96 | 1.05 | 1.14 | 1.23 | 1.32 | 1.40 | 1.49 | 1.58 | 1.67 | 1.76 | – |
| | 78h -82h | 83h -8Eh | 8Fh -99h | 9Ah -A4h | A5h -AFh | B0h -BBh | BCh -C6h | C7h -D1h | D2h -DDh | DEh -E7h | E8h -FFh |

FIG. 23

M2-9 CONVERSION MAP

| MONITORED VALUE / NORMAL VALUE | 0.0 | 0.1 | 0.2 | 0.3 | 0.4 | 0.5 | 0.6 | 0.7 | 0.8 | 0.9 | 1.0 |
|---|---|---|---|---|---|---|---|---|---|---|---|
| 0.9(70h-7Bh) | 0.00<br>00h<br>-08h | 0.09<br>09h<br>-13h | 0.18<br>14h<br>-1Fh | 0.27<br>20h<br>-2Bh | 0.36<br>2Ch<br>-35h | 0.45<br>36h<br>-41h | 0.54<br>42h<br>-4Dh | 0.63<br>4Eh<br>-58h | 0.72<br>59h<br>-63h | 0.81<br>64h<br>-6Fh | 0.90<br>70h<br>-7Bh |
| 0.9(7Ch) | 0.00<br>00h<br>-08h | 0.09<br>09h<br>-15h | 0.19<br>16h<br>-22h | 0.29<br>23h<br>-2Eh | 0.39<br>2Fh<br>-2Bh | 0.49<br>3Ch<br>-48h | 0.59<br>49h<br>-55h | 0.69<br>56h<br>-61h | 0.79<br>62h<br>-6Eh | 0.89<br>6Fh<br>-7Bh | 0.99<br>7Ch<br>-86h |

FIG. 24

M2-9 CONVERSION MAP

| MONITORED VALUE / NORMAL VALUE | 1.1 | 1.2 | 1.3 | 1.4 | 1.5 | 1.6 | 1.7 | 1.8 | 1.9 | 2.0 | UN-KNOWN |
|---|---|---|---|---|---|---|---|---|---|---|---|
| 0.9(70h-7Bh) | 0.99 7Ch 86h | 1.08 87h -92h | 1.17 93h -9Dh | 1.26 9Eh -A8h | 1.35 A9h -B4h | 1.44 B5h C0h | 1.53 C1h -CAh | 1.62 CBh -D6h | 1.71 D7h -E2h | 1.80 E3h -EEh | EEh -FFh |
| 0.9(7Ch) | 1.08 87h -93h | 1.18 94h -9Fh | 1.28 A0h -ACh | 1.38 ADh -B9h | 1.48 BAh -C6h | 1.58 C7h -D2h | 1.68 D3h -DFh | 1.78 E0h -ECh | 1.88 EDh -F9h | 1.98 FAh -FFh | – |

FIG. 25

33a EEPROM

| ADDRESS | DATA: HIGH ORDER BYTE (D15-D8) | DATA: LOW ORDER BYTE (D7-D0) | |
|---|---|---|---|
| 0x0011 | UNIT PRODUCT YEAR/MONTH #1 | UNIT PRODUCT YEAR/MONTH #2 | DATE OF PRODUCTION |
| 0x0012 | UNIT PRODUCT YEAR/MONTH #3 | UNIT PRODUCT YEAR/MONTH #4 | |
| 0x0013 | SOFTWARE REVISION NUMBER #1 | SOFTWARE REVISION NUMBER #2 | INFORMATION REGARDING REVISION OF SOFTWARE |
| 0x0014 | UNIT SERIAL NUMBER #1 | UNIT SERIAL NUMBER #2 | SERIAL NUMBER |
| 0x0100 | unused | typical value for LD CUR | STANDARD VALUES |
| 0x0101 | unused | MAX value for LD CUR | |
| 0x0102 | unused | typical value for S OUT | |
| 0x0103 | unused | MAX value for S OUT | |
| 0x0104 | unused | S OUT threshold(upper) | |
| 0x0105 | unused | S OUT threshold(lower) | |
| 0x0106 | unused | LD CUR threshold(lower) | |

FIG. 28

105a CONVERSION TABLE

| DISPLAY VALUE | 0.0 | 0.1 | 0.2 | 0.3 | 0.4 | 0.5 | 0.6 | 0.7 | 0.8 | 0.9 |
|---|---|---|---|---|---|---|---|---|---|---|
| 8-BIT INFORMATION VALUE | 00h ~09h | 0Ah ~16h | 17h ~23h | 24h ~2Fh | 30h ~3Ch | 3Dh ~49h | 4Ah ~56h | 57h ~62h | 63h ~6Fh | 70h ~7Ch |

| DISPLAY VALUE | 1.0 | 1.1 | 1.2 | 1.3 | 1.4 | 1.5 | 1.6 | 1.7 | 1.8 | 1.9 | 2.0 |
|---|---|---|---|---|---|---|---|---|---|---|---|
| 8-BIT INFORMATION VALUE | 7Dh ~89h | 8Ah ~95h | 96h ~A2h | A3h ~AFh | B0h ~BCh | BDh ~C8h | C9h ~D5h | D6h ~E2h | E3h ~EFh | F0h ~FBh | FCh ~FFh |

FIG. 31
PRIOR ART

OPTICAL TRANSMISSION APPARATUS MONITORING OPTICAL PERFORMANCE

This application is a continuing application, filed under 35 U.S.C. §111(a), of International Application PCT/JP00/06179, filed on Sep. 8, 2000.

BACKGROUND OF THE INVENTION (1) Field of the Invention

This invention relates to an optical transmission apparatus and, more particularly, to an optical transmission apparatus having the function of monitoring optical performance.

(2) Description of the Related Art

With an increase in the amount of information on communication networks, a growing number of optical transmission apparatuses using optical fibers have been supplied. In addition, there is a demand for high-speed large-capacity optical transmission. High-speed optical transmission is required, while importance has been attached to an optical performance monitoring (PM) function for accurately informing users of light quality.

FIG. 30 is a view showing a conventional optical transmission apparatus having a performance monitoring function. An optical transmission apparatus 100 which transmits light of one wavelength comprises a laser section 101, an O/E section 102, an amplifier section 103, an A/D conversion section 104, and a PM display section 105.

The laser section 101 outputs light of one wavelength. The O/E section 102 makes an optical/electrical conversion to output, for example, a laser bias current (LBC), being a bias current which flows to a laser, as a voltage value. This voltage value is directly proportional to the value of a bias current.

Output voltages vary according to the type of a laser, so the amplifier section 103 amplifies them to a constant value (between 0 and 4 V.) The A/D conversion section 104 makes an A/D conversion on a signal output from the amplifier section 103 to convert information indicative of a voltage value to an 8-bit digital signal.

The PM display section 105 converts an 8-bit digital signal to a display value by the use of a conversion table 105a and displays it on a user's terminal 2.

FIG. 31 is a view showing the conversion table 105a. The conversion table 105a gives display values corresponding to 256 pieces of 8-bit information. In this example, the pieces of 8-bit information from 00h to FFh are divided into twenty-one groups and one of the twenty-one values from 0.0 to 2.0 which are given in increments of 0.1 is assigned to each group. Therefore, if an 8-bit information value is one of, for example, 00h through 09h, then the value 0.0 will be displayed to a user.

Moreover, an adjustment is made individually at production time with initial variations in output voltage due to, for example, a difference in laser lot taken into consideration so that voltage output from the amplifier section 103 will be 2 V. As a result, a display value will be 1.0 (=reference value) at initial operation time at the stage of shipping a product. When light quality changes due to, for example, secular degradation or variations in temperature (when a bias current changes in the case of an LBC), a display value to a user will change by the zero point one. A user can manage light quality by monitoring a display value indicated in the conversion table 105a.

On the other hand, in recent years narrow band (NB) tunable optical transmission apparatuses have been developed. With an NB tunable optical transmission apparatus, a plurality of (n) one-wavelength waves can be used and one of them can be selected tunably. As a result, a user can reduce the number of optical transmission apparatuses he/she should possess, compared with a case where he/she uses optical transmission apparatuses each of which outputs only one one-wavelength wave. In addition, he/she need only ensure another NB tunable optical transmission apparatus as a backup. This is efficient.

By exerting conventional optical performance monitoring control over the above NB tunable optical transmission apparatus, however, display values vary according to wavelengths even if there is no change in light quality.

FIG. 32 is a view showing LBCs corresponding to a plurality of wavelengths. Vertical and horizontal axes in FIG. 32 indicate optical power transmitted (OPT) and an LBC respectively.

When the value of OPT, being light output power, is a (normal value), the values of LBCs for light of the wavelengths $\lambda 1$, $\lambda 2$, $\lambda 3$, and $\lambda 4$ are b1, b2, b3, and b4 respectively. That is to say, if there is a difference in wavelength, the values of LBCs differ from one another even in the case of light output power being the same. It is assumed that the values b1, b2, b3, and b4 correspond to the display values 0.4, 0.6, 0.8, and 1.0 respectively.

Therefore, the reference value 1.0 is displayed only when light of the wavelength $\lambda 4$ is used. Even if the values of the output power of light of the wavelengths $\lambda 1$, $\lambda 2$, $\lambda 3$, and $\lambda 4$ are the same and normal, values other than 1.0 will be displayed for light of the wavelengths $\lambda 1$, $\lambda 2$, and $\lambda 3$.

It is assumed that a wavelength used in an NB tunable optical transmission apparatus is set at first to $\lambda 4$ and that the apparatus is operated. Then a display value will be 1.0 (=reference value). If the wavelength is changed afterward from $\lambda 4$ to $\lambda 1$, a display value will be 0.4. That is to say, degradation in light quality will be displayed, but in reality a light output level is normal.

As stated above, even if light output power is normal, reference values vary according to wavelengths. Therefore, when an abnormality has occurred in an NB tunable optical transmission apparatus, an alarm are not generated.

For example, setting is made so that an alarm will be generated when a display value increases to 1.5 (one and a half times the reference value 1.0). If the wavelength $\lambda 4$ is used, then an alarm will be generated when a display value increases to 1.5. However, if the wavelength $\lambda 1$ is used, an alarm will not be generated because one and a half times the reference value is zero point six (=0.4×1.5.) If reference values vary according to wavelengths, alarm control will also be badly affected in this way.

Now, another problem with conventional optical transmission apparatuses will be described. Each vendor has placed importance on the development of more low-priced optical modules of higher quality for optical transmission apparatuses. However, conventional software for calculating performance parameters, such as an LBC, can be used only for a specific optical module. Therefore, software must also be revised to use a newly developed optical module. This is inefficient.

SUMMARY OF THE INVENTION

The present invention was made under the background circumstances as described above. An object of the present invention is to provide an optical transmission apparatus in which more reliable optical performance monitoring of higher quality can be performed.

Another object of the present invention is to provide an optical transmission apparatus in which efficiency in control by software over an optical module is improved.

In order to achieve the above first object, an optical transmission apparatus having an optical performance monitoring function is provided. This optical transmission apparatus comprises a light output unit for selecting and outputting light of one of a plurality of wavelengths, a digital information conversion unit for converting a performance parameter for the light to digital information, a conversion map management unit for managing a conversion map including a conversion format for converting the digital information indicative of values which vary according to the wavelengths of light with the same output power so that reference values at normal operation time for all the wavelengths will be the same and used for converting the digital information to a monitored value, and a display control unit for exercising control over the displaying of the monitored value corresponding to the digital information.

Moreover, in order to achieve the above second object, an optical transmission apparatus having an optical performance monitoring function is provided. This optical transmission apparatus comprises an optical module for sending light, an item acquisition unit for acquiring during the operation of the optical module an item necessary for calculating a performance parameter for the light, a replaceable standard value storage unit for storing a standard value for the item which depends on the optical module, a performance parameter calculation unit for calculating the performance parameter on the basis of the acquired item and the standard value, and a display control unit for exercising control over the displaying of the performance parameter.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 2 is a view showing a conversion map.
FIG. 3 is a view showing a conversion map.
FIG. 4 is a view showing a conversion map.
FIG. 5 is a view showing a conversion map.
FIG. 6 is a view showing a conversion map.
FIG. 7 is a view showing a conversion map.
FIG. 8 is a view showing a conversion map.
FIG. 9 is a view showing a conversion map.
FIG. 10 is a view showing a conversion map.
FIG. 11 is a view showing a conversion map.
FIG. 12 is a view showing a conversion map.
FIG. 13 is a view showing a conversion map.
FIG. 14 is a view showing a conversion map.
FIG. 15 is a view showing a conversion map.
FIG. 16 is a view showing a conversion map.
FIG. 17 is a view showing a conversion map.
FIG. 18 is a view showing a conversion map.
FIG. 19 is a view showing a conversion map.
FIG. 20 is a view showing a conversion map.
FIG. 21 is a view showing a conversion map.
FIG. 22 is a view showing a conversion map.
FIG. 23 is a view showing a conversion map.
FIG. 24 is a view showing a conversion map.
FIG. 25 is a view showing a conversion map.

FIG. 28 is a view showing an example of storage structure in an EEPROM.

FIG. 31 is a view showing a conversion table.

DESCRIPTION OF THE PREFERRED EMBODIMENT

Figure 1:
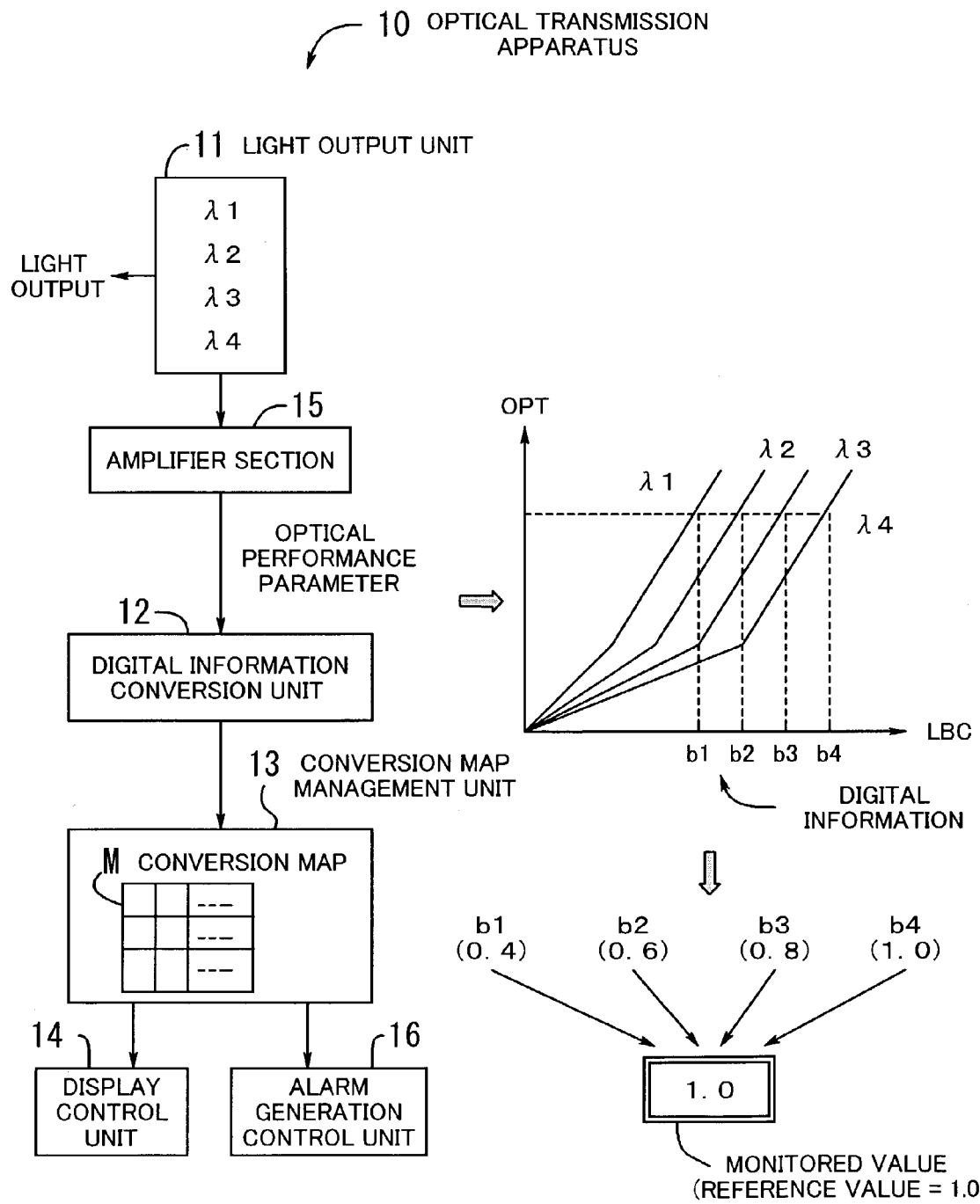
FIG. 1 is a view for describing the principles underlying an optical transmission apparatus according to the present invention.

An embodiment of the present invention will now be described with reference to the drawings. FIG. 1 is a view for describing the principles underlying an optical transmission apparatus according to the present invention. An optical transmission apparatus 10 makes optical transmission and exercises control over the monitoring of optical performance at optical transmission time.

A light output unit 11 selects and outputs light of one of a plurality of wavelengths. In the case of FIG. 1, the light output unit 11 selects and outputs light of one of the wavelengths $\lambda 1$, $\lambda 2$, $\lambda 3$, and $\lambda 4$. Moreover, the light output unit 11 has an optical/electrical conversion function and outputs performance parameters, such as an LBC, for light as voltage values.

An amplifier section 15 amplifies performance parameters sent from the light output unit 11 to a certain voltage.

A digital information conversion unit 12 converts performance parameters output from the amplifier section 15 to digital information. For example, the digital information conversion unit 12 makes an A/D conversion on the voltage value of an LBC to obtain hexadecimal digital information. At least one of an LBC, OPT, and optical power received (OPR), being physical layer performance parameters (PLPPs) defined in the Bellcore GR-253, will be used as an optical performance parameter.

Figure 32:
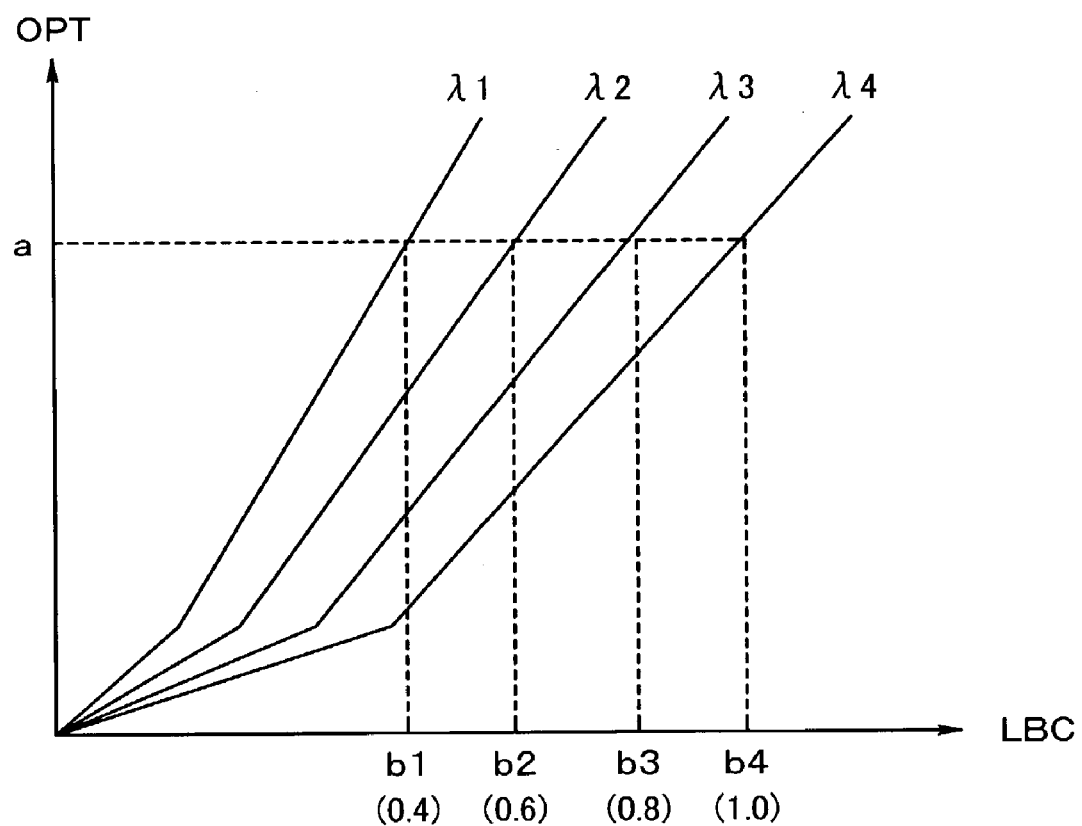
FIG. 32 is a view showing LBCs corresponding to a plurality of wavelengths.

A conversion map management unit 13 includes a conversion map M which consists of monitored values to be displayed to a user and digital information and manages the conversion map M. As stated above as to FIG. 32, if there is a difference in wavelength, the digital information b1, b2, b3, and b4, which indicate the values of LBCs, differ from one another even in the case of light output power being the same. Therefore, if the conventional conversion table 105a is used, the digital information b1, b2, b3, and b4 will correspond to the different display values 0.4, 0.6, 0.8, and 1.0 respectively.

By contrast, with the conversion map M according to the present invention, digital information indicative of values which vary according to the wavelengths of light with the same output power are converted so that reference values at normal operation time for all the wavelengths will be the same. As stated above, display values corresponding to the digital information b1, b2, b3, and b4 are 0.4, 0.6, 0.8, and 1.0 respectively. That is to say, these display values differ from one another if the conventional conversion table 105a is used. Assuming that a reference value at normal operation time is 1.0, all the digital information b1, b2, b3, and b4 are converted to 1.0 and this value is treated as a new display value (monitored value.) The details of the conversion map M will be described later as to FIGS. 2 through 25.

A display control unit 14 exercises control over the displaying of a monitored value on the conversion map M corresponding to digital information which will change when light quality changes due to, for example, secular degradation and variations in temperature. That is to say, the display control unit 14 exercises control not over the displaying of a display value based on the conventional conversion table 105a but over the displaying of a monitored value obtained by converting digital information according to a conversion format shown in the conversion map M. An alarm generation control unit 16 exercises control over the generation of an alarm on the basis of a reference value obtained by converting with the conversion map M.

Now, the details of the conversion map M will be described. Hereinafter it is assumed that a reference value at normal operation time is 1.0. If a monitored value displayed is 1.0, then a user can judge that light is transmitted normally. If a value other than 1.0 is displayed, he/she can judge that light has been degraded.

Conventionally, a value has been displayed to a user on the basis of the conversion table 105a shown in FIG. 31. However, the conversion map M according to the present invention includes not only the conversion table 105a but also conversion maps M1, M2, and M2-1 through M2-9 shown in FIGS. 2 through 25. A monitored value for each wavelength displayed to a user at normal operation time is converted to the reference value 1.0 by the use of them.

Conventionally, the 8-bit information values 30h, 4Ah, and 6Fh, for example, have corresponded to the reference values 0.4, 0.6, and 0.8 respectively. By using the conversion map M according to the present invention, all of them will be displayed as 1.0.

FIGS. 2 and 3 are views showing the conversion map M1. The conversion map M1 shown in FIGS. 2 and 3 is a table in which 256-byte digital information (00h through FFh) converted by the digital information conversion unit 12 is divided and assigned to numbers from 0.00 to 2.00 given in increments of 0.01.

Each field in the conversion map M1 is divided into upper and lower areas. Each upper area indicates one of the above numbers and the 256 bytes (00h through FFh) are randomly assigned to 201 lower areas.

If numbers from 0.00 to 2.00 are given in increments of 0.01, there are 201 numbers from 0.00 to 2.00. If the 256 bytes are assigned to the 201 lower areas, then 55 bytes will remain (256−201=55.) Therefore, the remaining 55 bytes are randomly assigned to the 201 lower areas. The conversion map M1 is made in this way. The remaining 55 bytes should be assigned averagely.

FIGS. 4 through 7 are views showing the conversion map M2. The conversion map M2 is a table which includes monitored values (values from 0.0 to 2.0 which are displayed to a user and which are given in increments of 0.1) in a horizontal direction and Normal values (values from 0.1 to 2.0 which correspond to the former display values shown in the conversion table 105a and which are given in increments of 0.1) in a vertical direction, and is made on the basis of the above conversion map M1.

In each field in the conversion map M2, a numeric value shown in the upper area is obtained by multiplying a Normal value and a monitored value together and a numeric value shown in the lower area is obtained by expressing the numeric value shown in the upper area in hexadecimal.

It is assumed that a Normal value is 0.1. Numeric values from 0.01 to 0.20 are obtained in increments of 0.01 by multiplying the Normal value 0.1 and monitored values together and are shown in the upper area of the corresponding row. By making these values apply to the conversion map M1, hexadecimal values to be given in the lower area of the row can be obtained. Therefore, if a Normal value is 0.1, these values are the same as those in the conversion map M1.

If a Normal value is 0.2, numeric values from 0.00 to 0.40 are obtained in increments of 0.02 and are shown in the upper area of the corresponding row. By making these values apply to the conversion map M1, 00h and 01h are obtained as values to be given in the lower area of a field in the conversion map M2 corresponding to the Normal value 0.2 and the monitored value 0.00. That is to say, a value shown in the upper area of the next field is 0.02, so values given in the lower area of the field in the upper area of which 0.00 is shown are 0.00 (=00h) and 0.01 (=01h) in the conversion map M1.

By filling in order in the fields in the conversion map M2 in this way with hexadecimal values on the basis of the conversion map M1, the conversion map M2 will be completed.

In the conversion table 105a shown in FIG. 31, 8-bit information values corresponding to the display value 0.1 are 0Ah through 16h. If the values 0Ah through 16h are normal, the display value 0.1 must be converted to 1.0 and the value 1.0 must be displayed. However, if an 8-bit information value is, for example, 16h, then the monitored value 1.9 will be obtained by making a conversion by the use of the conversion map M2.

That is to say, if the Normal value 0.1 shown in the conversion map M2 is converted to the monitored value 1.0, only the 8-bit information value 0Ah in the conversion table 105a can be used.

FIGS. 8 and 9 are views showing the conversion map M2-1. To solve the above problem, the conversion map M2-1 covers 0Bh through 16h which cannot be converted to 1.0 by the use of the conversion map M2.

In the row of the Normal value 0.1 (0Bh) in the conversion map M2-1, a monitored value corresponding to 0Bh is 1.0.0Bh corresponds to 0.11 in the conversion map M1. 0.11 and each of monitored values between 0.0 and 2.0 in the conversion map M2-1 given in increments of 0.1 are multiplied together and a decimal obtained is rounded to two decimal places. An obtained value is checked again against the conversion map M1 and the row of the Normal value 0.1 (0Bh) in the conversion map M2-1 is filled in.

When a figure at the second decimal place is increased by one in doing this multiplication, several bytes may be missing. These several bytes will be placed in a field corresponding to a value obtained by omitting a figure below the second decimal place.

For example, 0.11×0.4=0.044 in the row of the Normal value 0.1 (0Bh), so 0.04 is obtained by rounding. In the conversion map M1, 0.04 corresponds to 04h. However, 0.11×0.5 (next monitored value)=0.055, so 0.06 is obtained by rounding. In the conversion map M1, 0.06 corresponds to 06h. That is to say, 05h will be missing. In this case, 05h is placed in a field corresponding to the display value 0.5 obtained by omitting the figure below the second decimal place.

The conversion maps M2-1 through M2-9 shown in FIGS. 8 through 25 will cover in this way values which cannot be converted to the monitored value 1.0 in the case of a Normal value in the conversion map M2 being 0.1, 0.2, 0.3, . . . , or 0.9.

That is to say, FIGS. 10 and 11 are views showing the conversion map M2-2 which covers the values except 17h through 18h in the case of a Normal value being 0.2. FIGS. 12 and 13 are views showing the conversion map M2-3 which covers the values except 24h through 27h in the case of a Normal value being 0.3.

FIGS. 14 and 15 are views showing the conversion map M2-4 which covers the values except 30h through 34h in the case of a Normal value being 0.4. FIGS. 16 and 17 are views showing the conversion map M2-5 which covers the values except 3Dh through 42h in the case of a Normal value being 0.5.

FIGS. 18 and 19 are views showing the conversion map M2-6 which covers the values except 4Ah through 51h in the case of a Normal value being 0.6. FIGS. 20 and 21 are views showing the conversion map M2-7 which covers the values except 57h through 5Fh in the case of a Normal value being 0.7.

FIGS. 22 and 23 are views showing the conversion map M2-8 which covers the values except 63h through 6Ch in the case of a Normal value being 0.8. FIGS. 24 and 25 are views showing the conversion map M2-9 which covers the values except 70h through 7Bh in the case of a Normal value being 0.9.

The conversion map management unit 13 includes the conversion map M which consists of the conversion maps M1, M2, and M2-1 through M2-9 and the conversion table 105a and therefore can convert any 8-bit information value in the conversion table 105a to the reference value 1.0 at normal operation time by the use of the conversion map M.

However, attention must be paid to a case where Normal value×monitored value>2.0. In the conversion map M2 (Normal value=1.1, 1.2, . . . , or 2.0) shown in FIGS. 6 and 7, it is assumed that a Normal value is 1.1. Then the numeric values from 0.0 to 1.8 can be displayed, but the numeric values 1.9 and 2.0 cannot be displayed.

As stated above, as a Normal value approximates 2.0, the number of numeric values which can be displayed decreases. Therefore, the maximum of a monitored value to be displayed to a user should be set to 1.0 with initial variations in voltage output from a laser in the light output unit 11 at normal operation time due to, for example, a difference in lot taken into consideration. Accordingly, the gain, and therefore the output voltage, of the amplifier section 15 should be set in advance by circuit design so that the maximum of a monitored value will be 1.0.

It is assumed that voltage output from the laser varies initially in the range of ±10%. Then the maximum of initial variations is +10%. That is to say, a monitored value is 1.1. By taking this into consideration, the gain of the amplifier section 15 is set in advance so that a monitored value will be 1.0. By doing so, the range of initial variations will be from 0.8 to 1.0.

All the values from 0.8 to 1.0 are converted to 1.0 by the use of the conversion map M according to the present invention and are displayed. If the characteristics of the laser vary due to secular degradation or variations in temperature, a monitored value should be displayed according to a value in the row of the Normal value 0.8 in the conversion map M2. That is to say, once a Normal value in the conversion map M2 is determined, a subsequent value will be displayed according to a value in the row of the Normal value.

If a Normal value in the conversion map M2 is, for example, 0.1 (0Ah), an 8-bit map value may be one of 18h through FFh which are impossible for the original circuit structure. In such a case, notification of invalidity should be sent to a user. This will show the user that an abnormality has occurred in a circuit. The same applies to the other rows in the conversion map M2.

Figure 26:
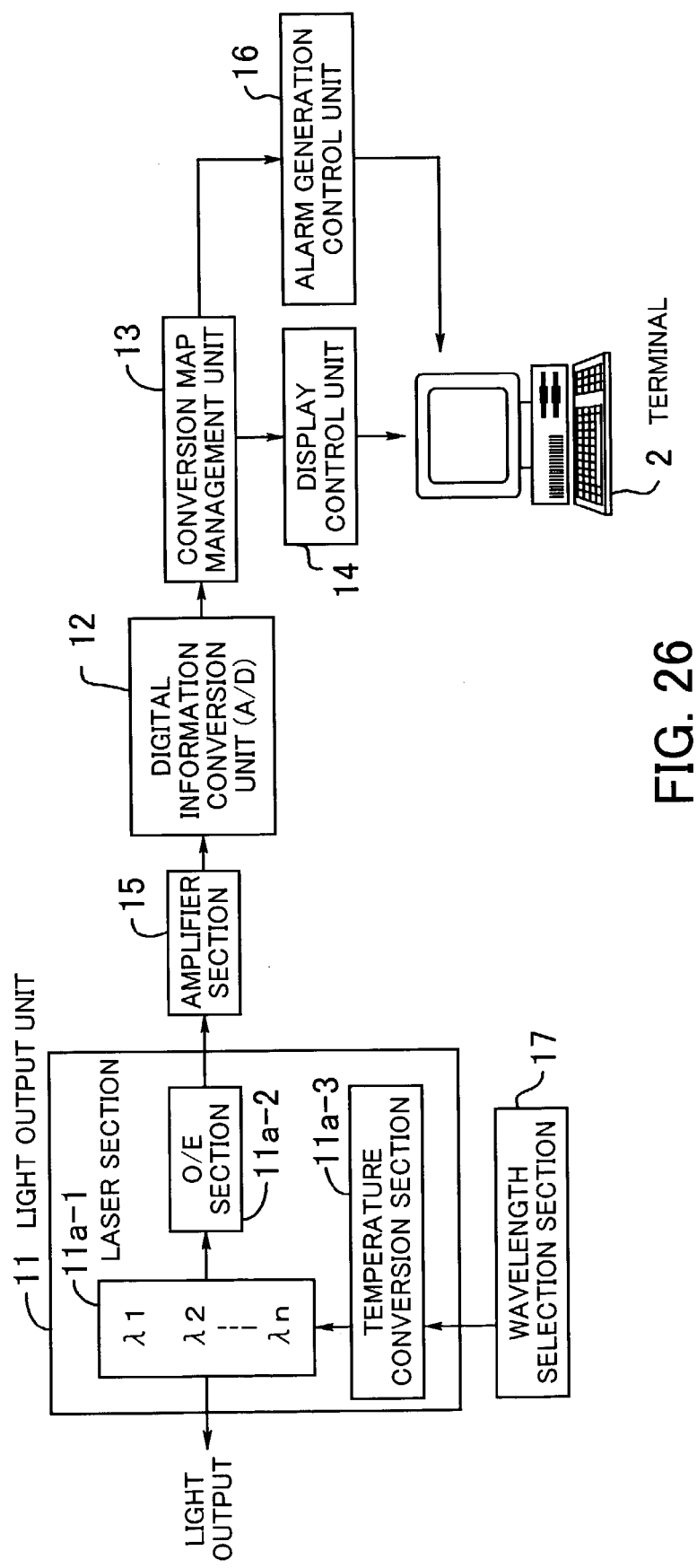
FIG. 26 is a view showing the structure of an NB tunable optical transmission apparatus.

Now, an NB tunable optical transmission apparatus to which the present invention is applied will be described. FIG. 26 is a view showing the structure of an NB tunable optical transmission apparatus. An NB tunable optical transmission apparatus 10a tunably transmits light of the n wavelengths λ1 through λn and exercises control over the monitoring of optical performance at optical transmission time.

A light output unit 11 includes a laser section 11a-1, an O/E section 11a-2, and a temperature conversion section 11a-3. The laser section 11a-1 outputs light of one of the n wavelengths λ1 through λn. The O/E section 11a-2 makes an optical/electrical conversion to output an LBC, being a bias current which flows to a laser, as a voltage value (the O/E section 11a-2 may output OPT or OPR in place of an LBC).

The temperature conversion section 11a-3 is a Peltier element. When it is given from the outside instructions to select a wavelength, the temperature conversion section 11a-3 exercises tunable control over the laser section 11a-1 by changing internal temperature to shift a wavelength.

A wavelength selection section 17 is, for example, a DIP switch. The wavelength selection section 17 sends instructions to select a wavelength to the temperature conversion section 11a-3 according to a switch setting chosen by a user.

An amplifier section 15 amplifies voltage to a constant value. A digital information conversion unit 12 makes an A/D conversion on a signal output from the amplifier section 15 to convert information indicative of a voltage value to an 8-bit digital signal.

A conversion map management unit 13 manages the conversion map M and converts digital information to a monitored value on the basis of the conversion format shown in the conversion map M. A display control unit 14 exercises control over the displaying of a monitored value on a user's terminal 2.

An alarm generation control unit 16 exercises control over the generation of an alarm on the basis of a reference value obtained by converting by the use of the conversion map M. Therefore, even if there is a difference in wavelength, the alarm generation control unit 16 can exercise control over the generation of an alarm on the basis of the same value.

As has been described in the foregoing, with the optical transmission apparatus 10 and NB tunable optical transmission apparatus 10a according to the present invention 1.0 is displayed on the basis of the conversion map M at normal operation time, whatever wavelength may be selected. Furthermore, an alarm can be generated properly. As a result, the reliability and quality of optical performance monitoring can be improved.

Moreover, as described above, conventionally, adjustment of the amplifier section 15 must be made individually due to initial variations in voltage output from the laser section 11a-1. In the present invention, however, 1.0 will be displayed at normal operation time even if there are initial variations in voltage output from the laser section 11a-1. Therefore, there is no need to individually adjust the amplifier section 15 and the manufacturing man-hour can be shortened.

Moreover, a conventional NB tunable optical transmission apparatus includes a plurality of amplifier sections, which have been adjusted individually, according to the number of wavelengths and exercises control over optical performance monitoring by selecting output from one amplifier section with a selector. However, if the present invention is applied, one amplifier section will do and the selector is unnecessary. Therefore, the scale of circuits can be reduced.

Figure 27:
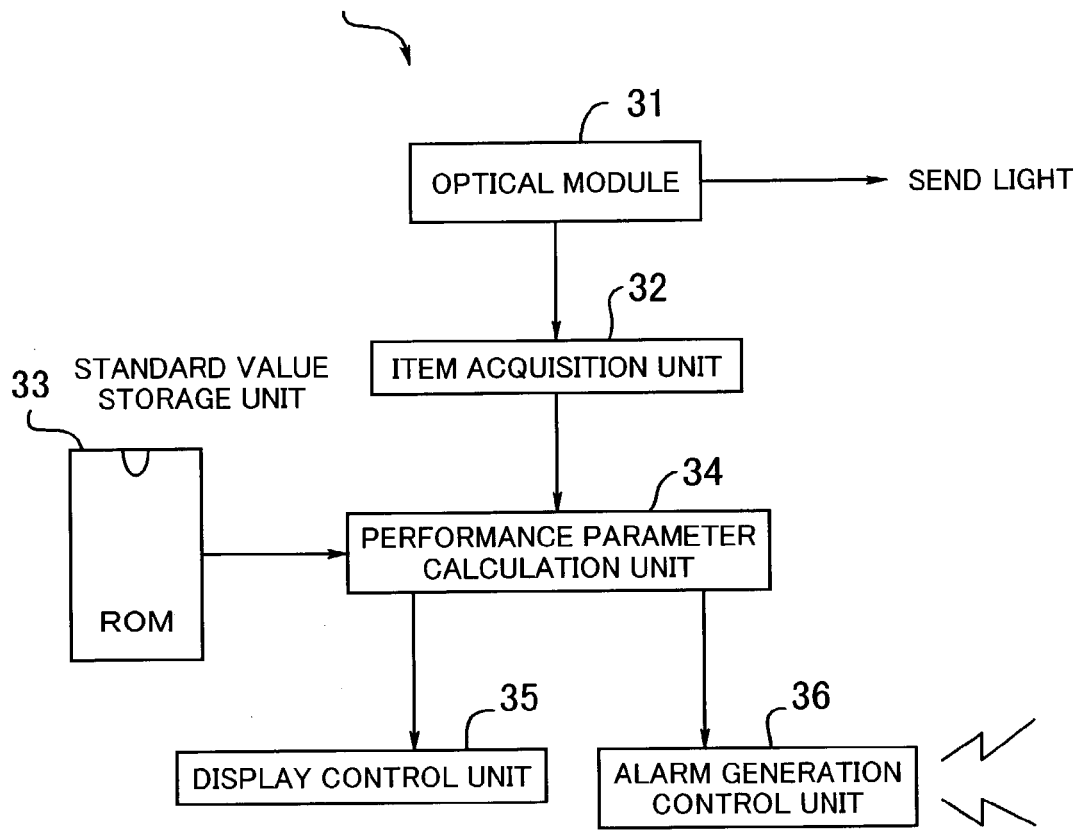
FIG. 27 is a view for describing the principles underlying an optical transmission apparatus according to the present invention.

Now, an optical transmission apparatus according to the present invention in which efficiency in control by software over an optical module is improved will be described. FIG. 27 is a view for describing the principles underlying an optical transmission apparatus according to the present invention. An optical transmission apparatus 30 makes optical transmission and exercises control over the monitoring of optical performance at optical transmission time.

An optical module 31 is a light sending module for sending light. An item acquisition unit 32 acquires during the operation of the optical module 31 an item (such as an LBC, OPT, or OPR included in PLPPs) necessary for calculating a performance parameter for light. For example, the item acquisition unit 32 makes an A/D conversion on an item, such as the LD current (the value of an electric current used for driving a laser diode) or the maximum value of an LD current, to obtain hexadecimal digital information.

A standard value storage unit 33 is a replaceable storage unit for storing standard values for items which depend on the optical module 31. The standard value storage unit 33 is, for example, an electrically erasable and programmable read only memory (EEPROM) in which data can be rewritten. A standard value is a value regarding a performance parameter corresponding to each optical module 31 manufactured by a vendor.

A performance parameter calculation unit 34 is calculation software for calculating a performance parameter. The performance parameter calculation unit 34 calculates a performance parameter on the basis of an acquired item and a standard value. To be concrete, the performance parameter calculation unit 34 calculates the ratio (value of item/standard value) of the value of an item obtained by actual measurement to a standard value considered 1.0 as a normalized value.

A display control unit 35 exercises control over the displaying of a performance parameter. That is to say, the display control unit 35 exercises control over the displaying of a normalized value. An alarm generation control unit 36 exercises control over the generation of an alarm on the basis of a standard value which has been written to the standard value storage unit 33.

Now, the standard value storage unit (hereinafter referred to as EEPROM) 33 will be described. FIG. 28 is a view showing an example of storage structure in an EEPROM.

An EEPROM 33a is the one corresponding to, for example, an optical module A produced by A company and stores standard values for the optical module A as well as the date of production, a serial number corresponding to an optical carrier (OC) level, and information regarding a revision of software.

In this example, an LD current, the maximum value of the LD current which can be monitored, output power (S-OUT), the maximum value of the S-OUT, and thresholds for judging whether the S-OUT and LD current are abnormal are stored as standard values.

Similarly, an EEPROM (EEPROM 33b) corresponding to an optical module B produced by B company will store standard values for the optical module B as well as the date of production, a serial number corresponding to an OC level, and information regarding a revision of software.

If a user uses the optical module A as the optical module 31, then he/she mounts the EEPROM 33a on the optical transmission apparatus 30. If he/she uses the optical module B, then he/she will remove the EEPROM 33a and mount the EEPROM 33b instead on the optical transmission apparatus 30 (data should be rewritten in the same EEPROM.)

Figure 29:
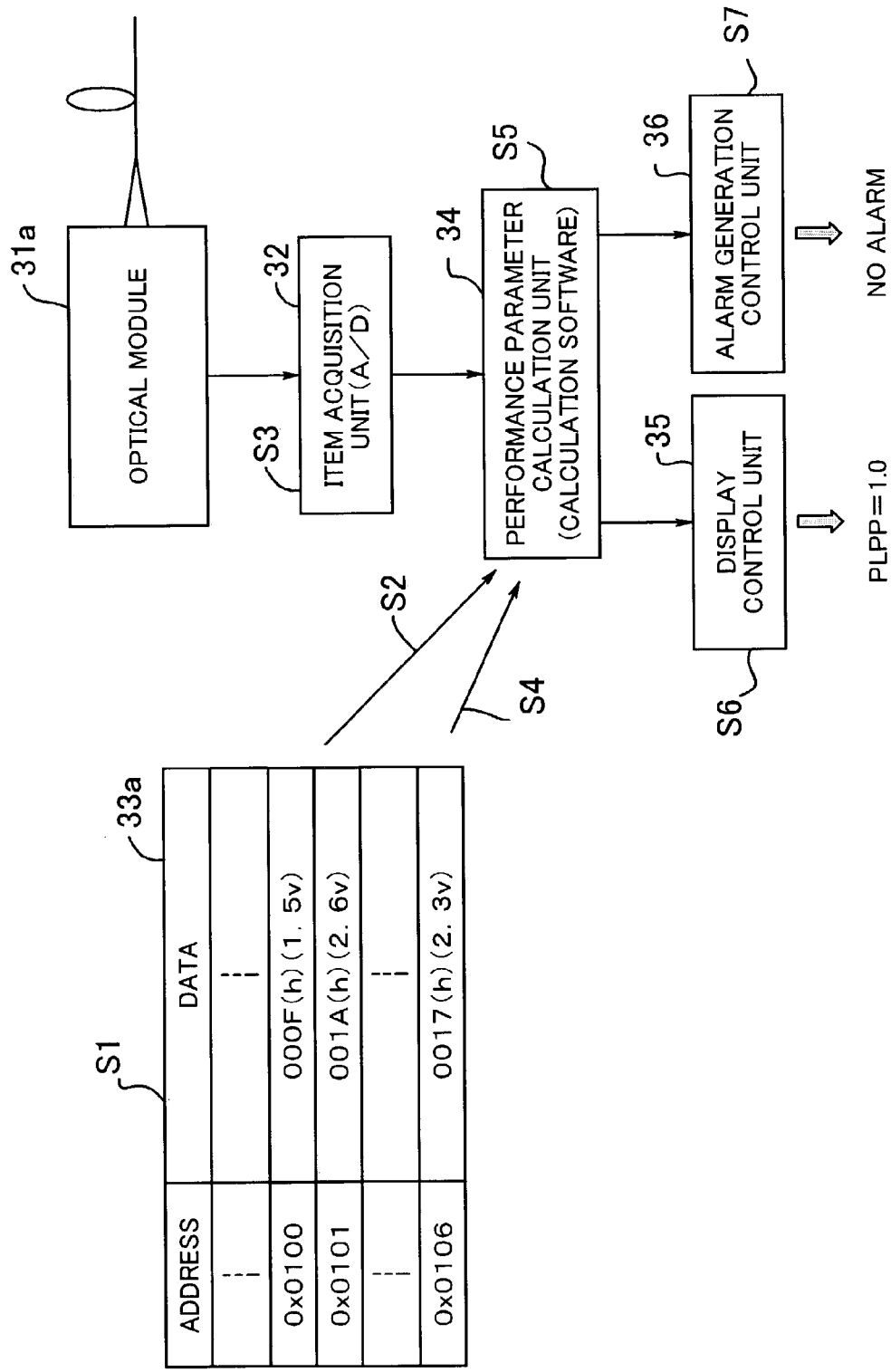
FIG. 29 is a view for describing operation in the optical transmission apparatus.
Figure 30:
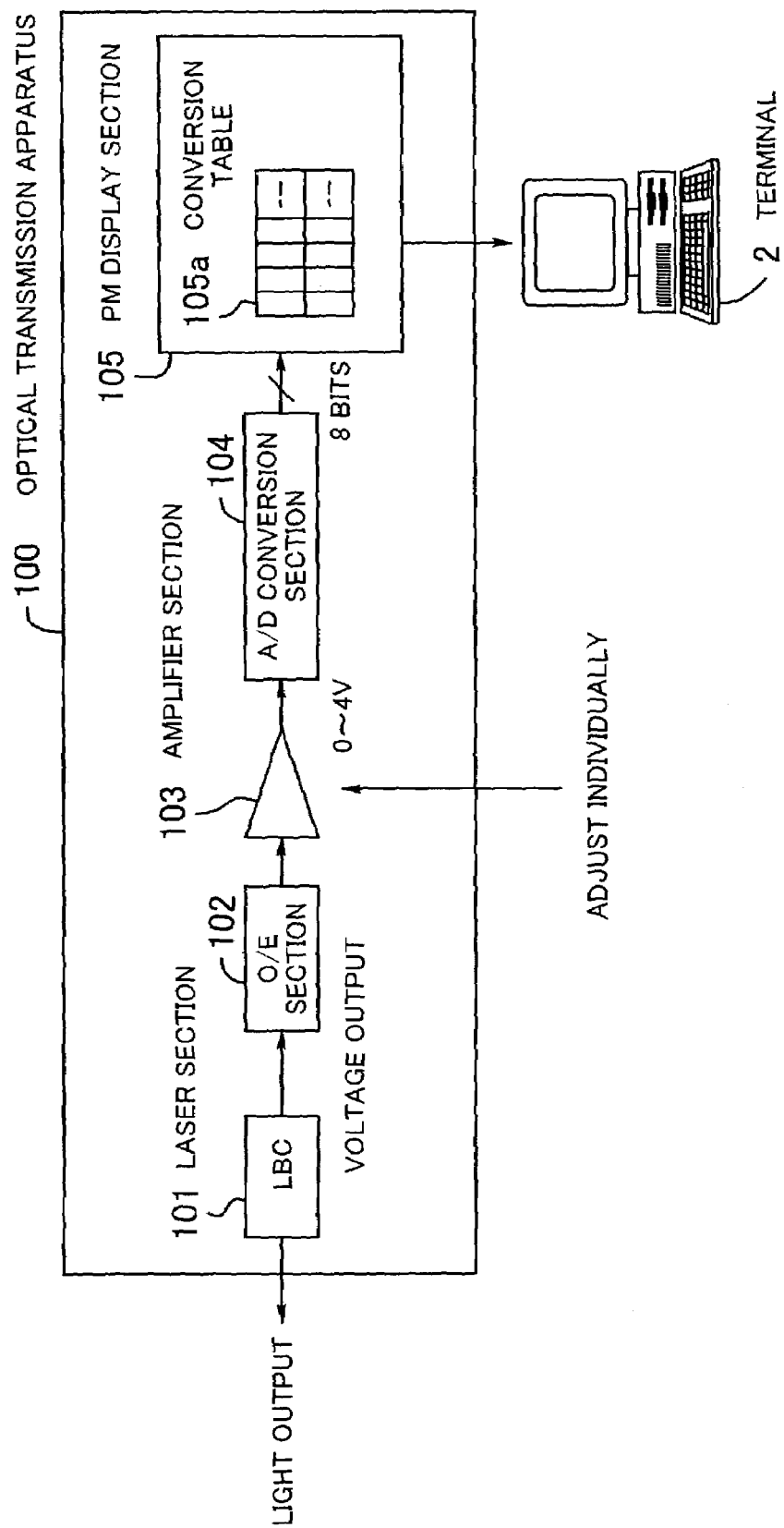
FIG. 30 is a view showing a conventional optical transmission apparatus having a performance monitoring function.

Now, operation in the optical transmission apparatus 30 will be described in detail. FIG. 29 is a view for describing operation in the optical transmission apparatus 30.

[S1] An LD current, a maximum value, and a threshold, being standard values, for an optical module 31a are written in advance to the EEPROM 33a as 6-bit values with, for example, 0.1 V as a step.

In this example, an LD current=1.5 V, the maximum value of the LD current which can be monitored=2.6 V, and a threshold for judging whether the LD current is abnormal=2.3 V are written in advance to the addresses 0×0100, 0×0101, and 0×0106, respectively, as 6-bit digital values with 0.1 V as a step.

[S2] The item acquisition unit (A/D conversion section) 32 calculates a voltage value corresponding to one step as a reference value which can be monitored. In this example, the maximum value of the LD current which can be monitored is 2.6 V and an 8-bit value is obtained by A/D conversion. Therefore, 2.6/256=0.0101 . . . and one step corresponds to 0.01 V.

[S3] The item acquisition unit 32 reads the LD current expressed as an analog value from the optical module 31a and converts it to a digital value (Vmon) by making an A/D conversion. It is assumed that this digital value is 1.5 V. Then Vmon=1.5 V will be converted to an 8-bit digital value with 0.01 V as a step.

[S4] The performance parameter calculation unit (calculation software) 34 reads the standard value (Vtyp) of the LD current written to the EEPROM 33a. In this example, Vtyp=1.5 V.

[S5] To calculate a normalized value, the performance parameter calculation unit (calculation software) 34 calculates Vmon/Vtyp and rounds an obtained value to one decimal. In this example, Vmon=1.5 V and Vtyp=1.5 V. Therefore, Vmon/Vtyp=1.0 and this is a normalized value.

[S6] The display control unit 35 displays the normalized value 1.0.

[S7] If Vmon exceeds the threshold written to the EEPROM 33a, then the alarm generation control unit 36 generates an alarm. In this example, the threshold of the LD current written to the address 0×0106 is 2.3 V and Vmon=1.5 V. Therefore, the alarm generation control unit 36 does not generate an alarm.

As described above, with the optical transmission apparatus 30 according to the present invention values which may be changed in future are written in advance to EEPROMs and an EEPROM is replaced at the time of an optical module being changed. By doing so, common calculation software can be used. As a results performance parameters for optical modules which differ among different vendors can be calculated without revising software.

As has been described in the foregoing, with the optical transmission apparatus according to the present invention, digital information values which vary according to the wavelengths of light with the same output power are converted to monitored values by the use of a conversion map for converting reference values at normal operation time for all wavelengths to the same value and control is exercised over the displaying of these monitored values. As a result, the same value can be displayed regardless of variation in optical performance parameter caused by a difference in wavelength. Therefore, the reliability and quality of optical performance monitoring can be improved.

Furthermore, the optical transmission apparatus according to the present invention includes a replaceable standard value storage unit for storing a standard value for an item necessary for calculating a performance parameter which depends on an optical module and calculates a performance parameter on the basis of an acquired item and a standard value. As a result, when an optical module is replaced, common software can be used and there is no need to revise software. Therefore, efficiency and a facility can be improved.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. An optical transmission apparatus having an optical performance monitoring function, the apparatus comprising:
   a light output unit for selecting and outputting light of one of a plurality of wavelengths;
   a digital information conversion unit for measuring a performance parameter of the output light and converting the measurement result into a digital value, wherein the digital value falls within a normal range when the light output unit is accurately adjusted, and wherein the normal range is a function of the wavelength of the output light;
   a conversion map for mapping a set of digital values onto a set of monitored values in such a way that every digital value in the normal range is mapped onto a same monitored value regardless of the wavelength of the output light;
   a conversion map management unit for obtaining, from said conversion map, one of the monitored values that corresponds to a combination of the normal range and the digital value representing the measured performance parameter; and
   a display control unit for displaying the obtained monitored value.

2. The optical transmission apparatus according to claim 1, further comprising an alarm generation control unit for exercising control over the generation of an alarm on the basis of a reference value obtained by converting with the conversion map.

3. The optical transmission apparatus according to claim 1, wherein the digital information conversion unit converts at least one of an LBC, OPR, and OPT to the digital information as the performance parameter.

4. An apparatus comprising:
   means for selecting and for outputting light of one of a plurality of wavelengths;
   means for measuring a performance parameter of the output light and converting the measurement result into a digital value, wherein the digital value falls within a normal range when the light output unit is accurately adjusted, and wherein the normal range is a function of the wavelength of the output light;
   a conversion map for mapping a set of digital values onto a set of monitored values in such a way that every digital value in the normal range is mapped onto a same monitored value regardless of the wavelength of the output light;
   means for obtaining, from said conversion man, one of the monitored values that corresponds to a combination of the normal range and the digital value representing the measured performance parameter; and
   means for displaying the obtained monitored value.

5. The apparatus according to claim 4, further comprising means for exercising control over the generation of an alarm on the basis of a reference value obtained by the means for managing the conversion map.

6. The apparatus according to claim 4, wherein the means for converting a performance parameter convert at least one of an LBC, OPR, and OPT to the digital information as the performance parameter.

* * * * *

UNITED STATES PATENT AND TRADEMARK OFFICE
CERTIFICATE OF CORRECTION

| | | |
|---|---|---|
| PATENT NO. | : 7,020,395 B2 | Page 1 of 1 |
| APPLICATION NO. | : 10/370499 | |
| DATED | : March, 28, 2006 | |
| INVENTOR(S) | : Dai Hagimura et al. | |

It is certified that error appears in the above-identified patent and that said Letters Patent is hereby corrected as shown below:

Column 12, line 24, change "man" to --map--

Signed and Sealed this

Twenty-fifth Day of July, 2006

JON W. DUDAS
*Director of the United States Patent and Trademark Office*